(12) United States Patent
Benzatti et al.

(10) Patent No.: US 9,578,461 B2
(45) Date of Patent: Feb. 21, 2017

(54) LOCATION CONTEXT, SUPPLEMENTAL INFORMATION, AND SUGGESTIONS FOR MEETING LOCATIONS

(71) Applicant: Microsoft Corporation, Redmond, WA (US)

(72) Inventors: Danilo L. Benzatti, Seattle, WA (US); Gregory A. Bolles, Snohomish, WA (US); Andrew Winslow Brough, Redmond, WA (US); Jason Andrew Cook, Renton, WA (US); Michael Anthony Faoro, North Bend, WA (US); Vanessa Feliberti, Sammamish, WA (US); Shivakumar Seetharaman, Redmond, WA (US); Yeelin Tan, Lynnwood, WA (US); Gustavo Varo, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 678 days.

(21) Appl. No.: 13/716,211

(22) Filed: Dec. 17, 2012

(65) Prior Publication Data
US 2014/0171129 A1    Jun. 19, 2014

(51) Int. Cl.
*H04W 4/02* (2009.01)
(52) U.S. Cl.
CPC .................... *H04W 4/025* (2013.01)
(58) Field of Classification Search
CPC ......... H04W 4/02; H04W 4/206; H04W 4/025
(Continued)

(56) References Cited

U.S. PATENT DOCUMENTS 6,370,533 B1 * 4/2002 Sato ..................... G06Q 10/10
6,381,603 B1 * 4/2002 Chan .................. G06F 17/3087
701/533

(Continued)

FOREIGN PATENT DOCUMENTS

EP    2026257 A1    2/2009

OTHER PUBLICATIONS

"Microsoft Office Live Meeting User Guide", Retrieved at <<http://www.meetingconnect.net/files/LiveMeetingUserGuide.pdf>>, Retrieved Date: Sep. 26, 2012, pp. 73.

*Primary Examiner* — George Eng
*Assistant Examiner* — Joseph Dean, Jr.
(74) *Attorney, Agent, or Firm* — Anand Gupta; Tom Wong; Micky Minhas

(57) ABSTRACT

Enhanced input field features and techniques for displaying and resolving location information in meeting items are provided. In response to a user's interaction with a place name displayed in the location field of a user interface for a meeting item, up to date information is retrieved about the location associated with the place name from a web service and displayed. The display can include a map image tile. In addition to enabling the displaying of up to date information, during creation of the meeting item, the location input field of a meeting item can present location suggestions from within the location input field, for example, as a drop-down listing of possible locations. The suggestions for completing a user's input text string to the location input field can be obtained from sources such as a web service, a mailbox, a managed database/directory service, a history cache/database or a combination thereof.

17 Claims, 16 Drawing Sheets

(58) Field of Classification Search
USPC .................................................. 455/456.1
See application file for complete search history.

(56) References Cited

U.S. PATENT DOCUMENTS

| | | | |
|---|---|---|---|
| 7,343,313 B2 | 3/2008 | Dorenbosch et al. | |
| 7,797,642 B1* | 9/2010 | Karam | G06Q 10/107 |
| | | | 345/419 |
| 7,937,067 B2 | 5/2011 | Maier et al. | |
| 8,219,318 B2 | 7/2012 | Kreft | |
| 8,230,034 B2 | 7/2012 | Atkins et al. | |
| 2002/0032589 A1* | 3/2002 | Shah | G06Q 10/02 |
| | | | 705/6 |
| 2002/0116530 A1* | 8/2002 | Burgess | G06F 17/30569 |
| | | | 709/246 |
| 2002/0184063 A1 | 12/2002 | Kaufman et al. | |
| 2008/0082256 A1* | 4/2008 | Komatsu | G01C 21/34 |
| | | | 701/411 |
| 2008/0102856 A1* | 5/2008 | Fortescue | G06Q 30/02 |
| | | | 455/456.1 |
| 2008/0133282 A1 | 6/2008 | Landar et al. | |
| 2008/0288516 A1* | 11/2008 | Hadfield | G06F 17/30666 |
| 2009/0292782 A1* | 11/2009 | Kim | H04W 4/02 |
| | | | 709/206 |
| 2010/0179756 A1 | 7/2010 | Higgins et al. | |
| 2010/0189312 A1 | 7/2010 | Nielsen et al. | |
| 2010/0235446 A1 | 9/2010 | Hehmeyer et al. | |
| 2011/0161453 A1 | 6/2011 | Feliberti et al. | |
| 2012/0102119 A1 | 4/2012 | Balogh et al. | |
| 2012/0142324 A1 | 6/2012 | Kim et al. | |
| 2012/0191500 A1 | 7/2012 | Byrnes et al. | |
| 2013/0017839 A1* | 1/2013 | Lee | H04W 4/023 |
| | | | 455/456.1 |

* cited by examiner

| Location Entry | Relevance Index |
|---|---|
| Location 1 | 9.2 |
| Location 2 | 8.3 |
| | |
| Location X | 5.0 |

Increasing Relevance (frequently used)

LOCATION CONTEXT, SUPPLEMENTAL INFORMATION, AND SUGGESTIONS FOR MEETING LOCATIONS

BACKGROUND

The location field for a meeting or scheduling request is an underutilized component in current calendaring and scheduling software. Typically, an organizer of a meeting includes a location of the meeting in the location input field text box of a meeting item, such as a meeting invitation request, event compose form, appointment, or contact card. This meeting location is generally input as freeform text into the text box in order to define the meeting location. The organizer enters the correct name and/or address of the desired meeting place in its entirety in order to provide the meeting location in the meeting item in a manner readily translatable to a recipient (who may use the location information to obtain a map of the location or directions to the location). To enter the desired meeting place in its entirety, the organizer plans in advance for finding a location for the meeting or appointment, often moving between the meeting item form and a browser in order to determine the correct name or address of the desired place.

Alternatively, because entering a desired meeting place in its entirety along with a street address or long text can be cumbersome (or not readily available), a meeting organizer may use shorthand location entries. For example, an organizer may define the meeting location as "my office," "coffee shop," or "main conference room."

The shorthand versions may be sufficient in certain cases, but can also create some ambiguity or confusion. In one case, the ambiguity can result from out of date contact information. For example, "my office" may not be clearly understood by a recipient if they do not have the most up-to-date information about the organizer available due to, for example, having an old contact card. In another case, the ambiguity can result from there being multiple possible physical locations for a particular meeting location (such as using a name of a chain coffee shop) and/or no physical address provided that could be used to obtain directions to the meeting.

BRIEF SUMMARY

Enhanced location fields for meeting items including a meeting request form, appointment, email, calendar entry, contact entry, and the like are provided.

A user can be provided with location suggestions when a user interacts with a location field of a meeting item. By presenting location suggestions, a user can reduce the amount of his/her typing and enable a more definite understanding between meeting attendees of the actual location in which the meeting will be taking place even when freeform text or an alias is used to describe a meeting place. Embodiments can be implemented as part of calendaring or scheduling software that is a stand-alone application or a component of a personal organizer or information management system.

Location suggestions may be based on several sources. In one embodiment, location suggestions may be inferred from entered text and known recipients of a meeting item. In another embodiment, location suggestions may be provided based on entered names or addresses that may be looked up in a server. Other embodiments may base location suggestions on locations associated with stored contacts. Frequently used locations or nearest locations may be suggested in another embodiment. Location suggestions may also be based on stored favorites and/or user-created aliases. In another embodiment, location suggestions include rooms within a facility, such as a building. If desired, particular embodiments can condition location suggestions on resource availability. Particular embodiments may optionally supply location suggestions with geo-coordinates.

Location suggestions may be displayed dynamically with information pertaining to a location suggestion updated in real-time. Additionally, some embodiments may include visual indicators adjacent to location suggestions for easy identification.

According to an embodiment, all of the information about a meeting location is not stored locally with a client device or in a database associated with an email or scheduling program. Instead, some or all of the information about the meeting location can be obtained as needed in real time by requesting the information from a phonebook or other location web service. The information can include, but is not limited to, phone number, web site Uniform Resource Locators (URLs), geo-coordinates, address and other details.

In addition, a map image tile can be provided when displaying information about a location. The map image tile can be obtained using the geo-coordinates of the location through use of a map or imagery web service.

In certain embodiments, new properties are associated with meeting items and contact information. In one embodiment, a directory service or managed database of building resources can store information about rooms within the building along with a geo-coordinate property by which each individual room has its own independent (from the main building) geo-coordinates. In another embodiment, previously used meeting locations provided with a meeting item are stored along with an id recognizable by a web service for identifying the location. In yet another embodiment, meeting items are appended with a WhereCreated/WhereModified location property such that, where a user grants permission, geo-coordinates can be stamped on a meeting item upon creation (or modification) to indicate where the meeting item was created (i.e., where the user was at the time the user was creating the meeting item).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
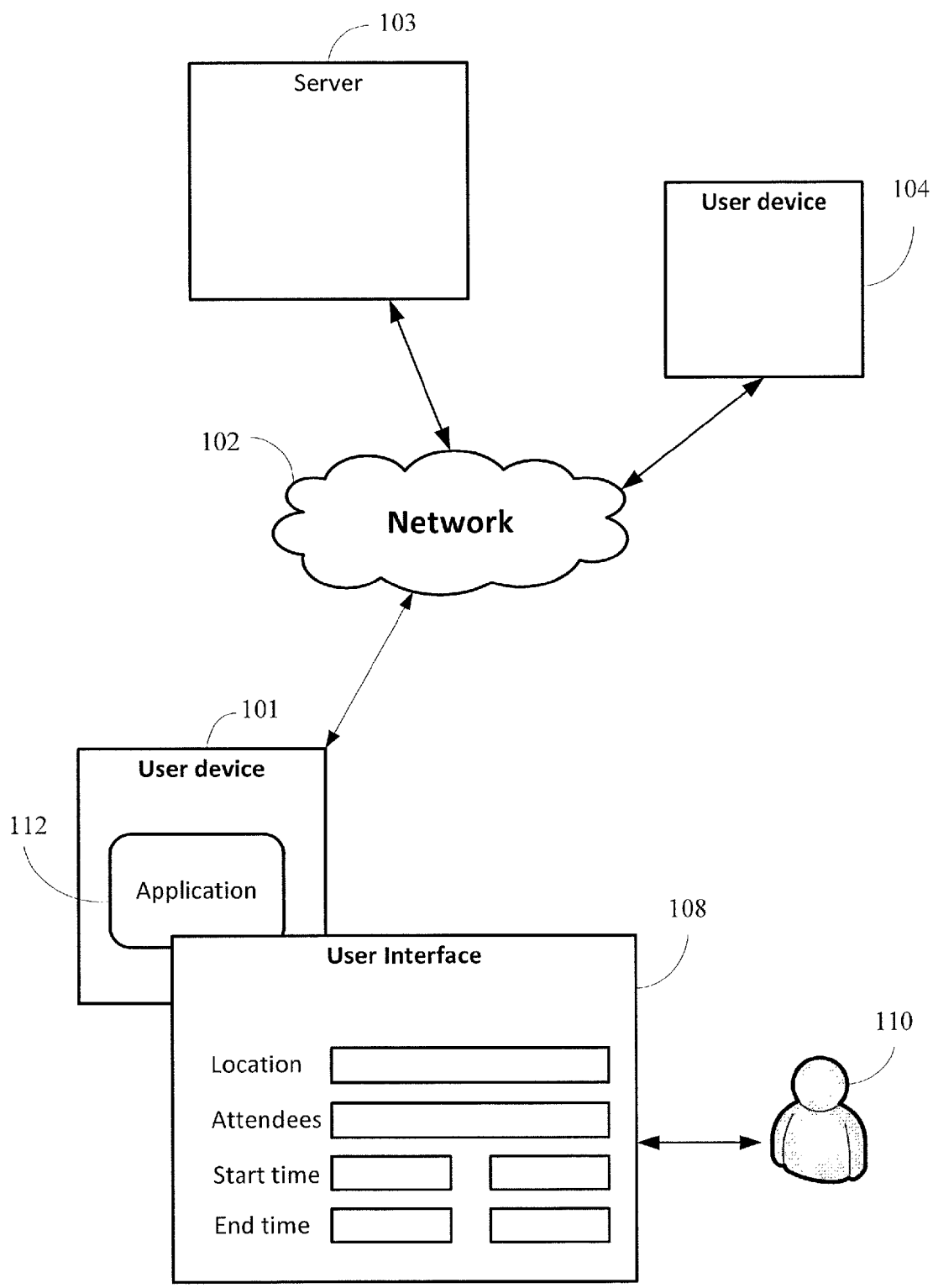
FIG. 1 shows an operating environment in which embodiments of the invention may be practiced.

Enhanced input field features and techniques for displaying and resolving location information in meeting items are provided. A "meeting item" includes, but is not limited to, a meeting request form, appointment, email, calendar entry, contact entry, and the like. "Resolution" or the "resolving" of the location information refers to the matching of an entity to an identifier understood by the computer system for a particular context or activity.

Features of certain embodiments of the invention include displaying dynamic data about a meeting location; resolving locations with geo-coordinates; assigning coordinates to internal rooms of a building; incorporating where a meeting item is created and/or modified as properties of meeting item; incorporating local map tiles as a visual identification of places; providing autocomplete and location suggestions; including most recently used locations and locations inferred from attendees; or a combination thereof.

Embodiments can be implemented as part of calendaring or scheduling software that is a stand-alone application or a component of a personal organizer or information management system. The personal organizer or information management system can be a personal information manager (PIM) tool configured for a mobile or desktop computing device. A PIM can include one or more features such as scheduling and calendar programs, task lists, address books, and e-mail programs. The electronic calendaring and scheduling programs of a PIM, which can collectively be referred to as a scheduling application, enable a user to generate a meeting request or other meeting item by interacting with the scheduling application through a user interface.

The user interface of a meeting item can include a plurality of input field options to parameterize the meeting request (or other meeting item).

For example, the user interface allows the user to indicate a date, time, and location at which a meeting is to be held. The user interface can also allow the user to select a group of attendees to invite to the meeting as well as to provide a description or message associated with the meeting request.

According to various embodiments of the invention, the location component of the user interface is an enhanced input field configured to provide at least one of context, supplemental information, and suggestions for meeting locations. Instead of a simple text box, location input fields of some embodiments of the invention provide a more robust and interactive user experience.

Once the user completes the desired selections for the meeting, the scheduling application can carry out the next, processes as typically performed by a PIM in scheduling an appointment and sending a meeting request. For example, based on the information that the user enters via the user interface, the scheduling application creates an object which is representative of the meeting and enters the object on the user's calendar as an appointment. Such objects are typically defined by a number of properties, some of which are defined by the user input information which the user provides while generating the meeting request.

Since other people are identified as attendees for the user's appointment, the appointment entered on the calendar can be referred to as a meeting. The scheduling application calls an electronic mail application (in accordance with a messaging application programming interface (MAPI) or other suitable API) to communicate the meeting with the identified attendees. The electronic mail application creates another object (an electronic mail meeting request object) indicative of the meeting request and the electronic mail application (or suitable transport) formats this electronic mail meeting request object into a well-defined electronic mail message suitable for transmission.

The electronic mail application then interacts with a specified transport and transports the electronic mail meeting request object to a network which routes the electronic mail meeting request object to the designated attendees. In doing so, the electronic mail application typically accesses an address book stored in a database to obtain the fully qualified electronic mail address for the attendees. This is also typically done by calling MAPI or other suitable API methods associated with the database storing the address book. The generation of the meeting object and the creation of the electronic mail meeting request object will be referred to herein collectively as creating a meeting request. Synchronization components may be included so that a user may have a consistent experience across various platforms and devices.

Some commonly commercially available PIMs include those sold under the brand name MICROSOFT OUTLOOK, a registered trademark of Microsoft Corp.; and IBM LOTUS NOTES, a registered trademark of International Business Machines Corp. For purposes of this discussion, PIMs also include separate electronic mail applications, such as that available under the brand name MICROSOFT EXCHANGE, a registered trademark of Microsoft Corp.

In one embodiment, similar to providing a contact card presenting information about a user's contact, such as phone number, physical address, email, and other useful information about the contact, a location may have a corresponding "contact card" that provides information about the location. As with the contact card for a person, the contact card for locations can be stored in a database and managed by a PIM or other software application.

FIG. 1 shows an operating environment in which embodiments of the invention may be practiced. It will be appreciated that the operating environment shown in FIG. 1 is merely one example configuration of a system configured to perform the actions described herein, and other configurations are also contemplated.

Referring to FIG. 1, an example operating environment can include a user computing device 101 operably coupled to a network 102 to communicate with one or more servers, such as server 103, as well as other user computing devices, such as user computing device 104.

The network 102 can be, but is not limited to, a cellular network (e.g., wireless phone), a point-to-point dial up connection, a satellite network, the Internet, a local area network (LAN), a wide area network (WAN), a WiFi network, an ad hoc network or a combination thereof. Such networks are widely used to connect various types of network elements, such as hubs, bridges, routers, switches, servers, and gateways. The network 102 may include one or more connected networks (e.g., a multi-network environment) including public networks, such as the Internet, and/or private networks such as a secure enterprise private network. Access to the network 102 may be provided via one or more wired or wireless access networks as will be understood by those skilled in the art.

As will also be appreciated by those skilled in the art, communication networks can take several different forms and can use several different communication protocols. Certain embodiments of the invention can be practiced in distributed-computing environments where tasks are performed by remote-processing devices that are linked through a communications network. In a distributed-computing environment, program modules can be located in both local and remote computer-readable storage media.

The user computing device 101 can be, but is not limited to, a personal computer (e.g. desktop computer), laptop, personal digital assistant (PDA), mobile phone (or smart phone), tablet, slate, or terminal, which may be used to access a server, such as server 103, over the network 102. The server 103 may be an enterprise server, cloud based server, dedicated server, host server, or the like. The other user computing device(s), such as user device 104, can be, but is not limited to, a personal computer, laptop, PDA, mobile phone (or smart phone), tablet, slate, or terminal, which may be used to access a server, such as server 103, and communicate with user computing device 101 and other user computing devices over the network 102.

It should be apparent that the user computing devices 101, 104 may each be any type of computer system that provides its user the ability to load and execute software programs and the ability to access a network, such as network 102, and communicate with one or more servers, such as server 103, as well as other user computing devices and each other.

A user computing device, e.g., the user computing device 101, is configured to receive input from a user 110, such as by voice, touch, and/or through a keyboard and/or mouse that is operably coupled to the first computing device 101. The user computing device 101 can further include a display (e.g., a computer monitor), that is configured to display one or more user interfaces 108 to the user 110. In some embodiments, the display can be a touchscreen such that the user computing device 101 may receive user input through the display.

At least some of these user interfaces 108 include fields for initiating and/or continuing communications with one or more other entities (e.g., generally referred to herein as potential recipients and/or contacts). For example, in one embodiment, a PIM application 112 (or a stand-alone scheduling and/or email application) is stored on the user computing device 101 (e.g., a client-side application).

In another embodiment, the user 110 may access a web-based PIM application, email application, instant messaging application, video-conferencing application, and the like using a standard internet browser (as application 112), and the application's interface may be displayed to the user 110 within the internet browser. Thus, the application used to compose a meeting item (or other communication) and/or initiate a communication may be a client-side application and/or non-client side (e.g., a web-based) application.

When the application 112 is launched, a user interface 108 for the PIM application 112 may be presented to the user 110. The user 110 may prepare a meeting request via the user interface 108 that may be sent to one or more recipients. Similarly, the recipients may view a meeting request via a user interface. While the particular arrangement of the user interface 108 and input field options may vary across different applications and products, embodiments of the invention are applicable to any user interface for which a location input field is provided.

The location of a meeting is one of the fields of a meeting item. Currently, previously used (or known) locations are stored in a database (or cache) and managed by a PIM or other software application. However, information about a location can change over time. For example, when a business moves to a new location or a contact moves to a new home or office, the address of the business, home, and office will change. Further, many venues can have similar names (e.g. chain coffee houses, restaurants, etc.). Where multiple locations have a same name, knowing which address of the place is the intended location can also be helpful.

According to certain embodiments, when a user enters a location into a location input field or a recipient accesses the location contact card, instead of merely presenting location information stored in the database (or cache) associated with the application, real-time, dynamic data about the location is looked up by the application 112 and displayed to the user within the user interface 108. The real-time look-up can be performed by calling a web service or other application running on a server 103. By looking up data about the location at the time a location is entered into a location input field and/or at the time a recipient accesses the location contact card, the most up-to-date information concerning a location is displayed.

Figure 2:
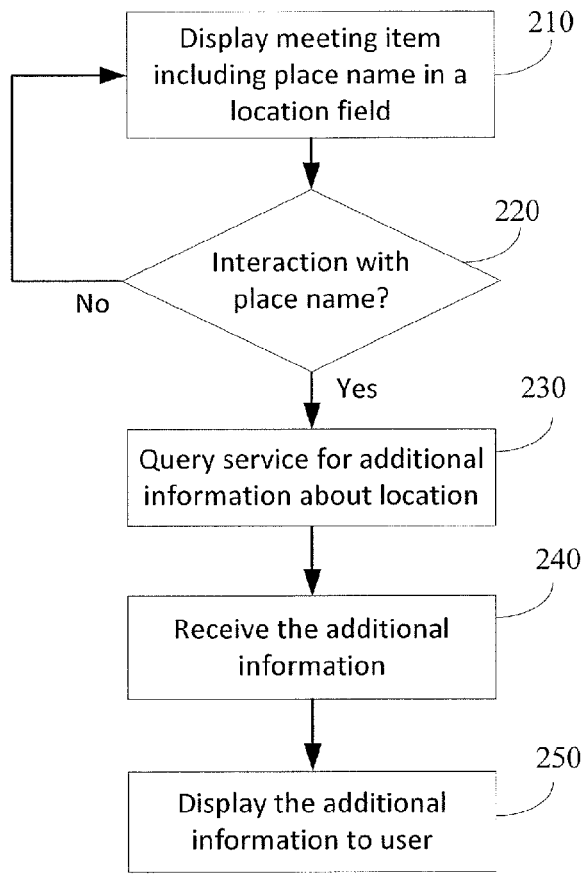
FIG. 2 shows a process flow for a method of displaying dynamic data about a meeting location according to an embodiment of the invention.

FIG. 2 shows a process flow for a method of displaying dynamic data about a meeting location according to an embodiment of the invention. Referring to FIG. 2, a meeting item can be displayed to a user (210) either within a client side PIM application or within a web browser. The meeting item can be a meeting item form used when creating the meeting item or a received meeting item. If the place name (or address) being displayed within the meeting item is interacted with (220), a web service is queried for additional information about the location (230). Once the additional information is received (240), the additional information can be displayed to the user (250). The additional information can be displayed in the form of a location contact card.

According to an embodiment of the invention, all of the contact information and information about a meeting location are not stored locally with a client device or in a database (storage media) storing a user's contacts (such as an address book or mailbox). Instead, at least some of the contact information and information about meeting locations can be obtained as needed "on-the-fly" (in real time). This information can be displayed alone or along with other information on the contact card for the meeting location. The information looked up in real time and used to populate the contact card can include, but is not limited to, phone number, web site URLs, geo-coordinates, address and other details.

Some information about a meeting location may be stored locally to facilitate user experience. For example, some information about a meeting location may be stored locally (e.g., in a cache associated with the user device) and displayed to a user while the look-up process is being performed in order to minimize a delay in providing information to the user.

Figure 3:
FIG. 3 shows an example user interface and displayed contact card according to an embodiment of the invention.

FIG. 3 shows an example user interface and displayed contact card according to an embodiment of the invention. As shown in FIG. 3, when a user interacts with a place name displayed within a meeting item 300, a location contact card 310 is displayed.

When the user interacts with the displayed location name, for example by touching the screen or clicking or moving a mouse over the displayed name, the location contact card 310 is opened to display additional information about the place. Other interactions, including particular keystrokes, scrolling actions, or verbal command may also be used to open the card.

In the example shown in FIG. 3, when a user moves a mouse over the displayed place name "The Coffee Shop," indicated by cursor 312, the location contact card 310 for "The Coffee Shop" is displayed. The phone number and web addresses (URLs) provided by the location contact card 310 are retrieved from the server on demand.

In one embodiment, up-to-date information about a location is able to be retrieved by using the place name (e.g., the text provided as the location in the location input field) and/or an identifier associated with the location. The place name and/or identifier is used to query a known source.

A "known" source refers to a trusted source. That is, a source by which the information can be retrieved without requiring active approval from a user each time the source is requested. An example of a known source includes a secure email server that hosts the user's email (e.g. "mailbox"). In a specific implementation, a mail web service (such as MICROSOFT EXCHANGE Web Services), a location search service (such as BING location services), and a phonebook search service (such as BING phonebook services) can be known sources for meeting locations. BING is a registered trademark of Microsoft Corp.

In certain embodiments, a meeting location can be selected or resolved from 'known" sources. Known sources can include those accessed for providing location suggestions for meetings and appointments.

Thus, when a location from a known source is entered into a location input field and an indicia of an interaction is received by the system, a contact card can be displayed and the information populating the contact card can be from the known source.

Returning to the Coffee Shop example shown in FIG. 3, the name "The Coffee Shop" may be used to access information from a phonebook or map service. In another embodiment, where an address is provided in the location field, the address (or partial address) may be used to access information from the phonebook or map service. In some embodiments, an identifier, such as a uniform resource identifier (URI), may be used to retrieve the information from the phonebook or map service.

For embodiments using the identifier (id), the id may be stored in a database associated with the user's computing device. The origination of the id can occur during a first use of a particular location. The location id can also be transmitted with the meeting item request so that a recipient's computing device can use the id provided with the request.

For embodiments in which a location id is provided, each time information about the location is to be displayed, the system retrieves the appropriate information using the id. When a card is opened for a particular location, a request is made for additional data based on the location's id. For example, a "find" request can be sent to the source from which the location is obtained. Then, when a response is received from the source, the information in the card is populated with the additional data about the location.

This process can appear instantaneous to the user and provide the user with more accurate, up-to-date information than if the contact card reflected what is stored in a contact database.

The physical address and other information regarding a location can be retrieved as needed instead of being stored locally. In that manner, up-to-date information can be looked-up as needed (e.g., on the fly). The location information can be considered "dynamic" because it changes as sources are updated instead of being static because of being stored locally in a storage media associated with the user's device.

The particular id associated with a location may depend on the source with which the location is associated. That is, the id may correspond to the source of the information and be used by the source to provide the most recent information about the location. For example, when the location source is a phonebook service, the location URI (e.g., a uniform resource identifier for a geographic location) can be a string of characters providing a unique identification for the location that is understood by the phonebook service. This URI can be stored as the location's id, which is used in a look-up operation on the server for additional information. Upon receiving the response from the server, the data is displayed to the user.

When a meeting item is created and a user inputs or selects a particular meeting location that is from a known source, the id can be stored in a manner to associate the id with the location and may be sent with a meeting item to uniquely identify the location.

An example of a service that may be used in accordance with an embodiment of the invention includes the BING Application Programming Interface (API) source types, including the phonebook source type through the BING Phonebook service. In one such embodiment, the id is a Yellow Pages ID (YPID) provided by BING Phonebook service.

In one example case, a user may be operating a PIM application through a browser, such as available by the webmail service OUTLOOK Web App (OWA) available from Microsoft Corp. The webmail service enables the user to connect remotely to a mail server such as a MICROSOFT EXCHANGE Server. An example operating environment is shown in more detail in FIG. 4, which shows an operating environment in which embodiments of the invention may be practiced.

Figure 4:
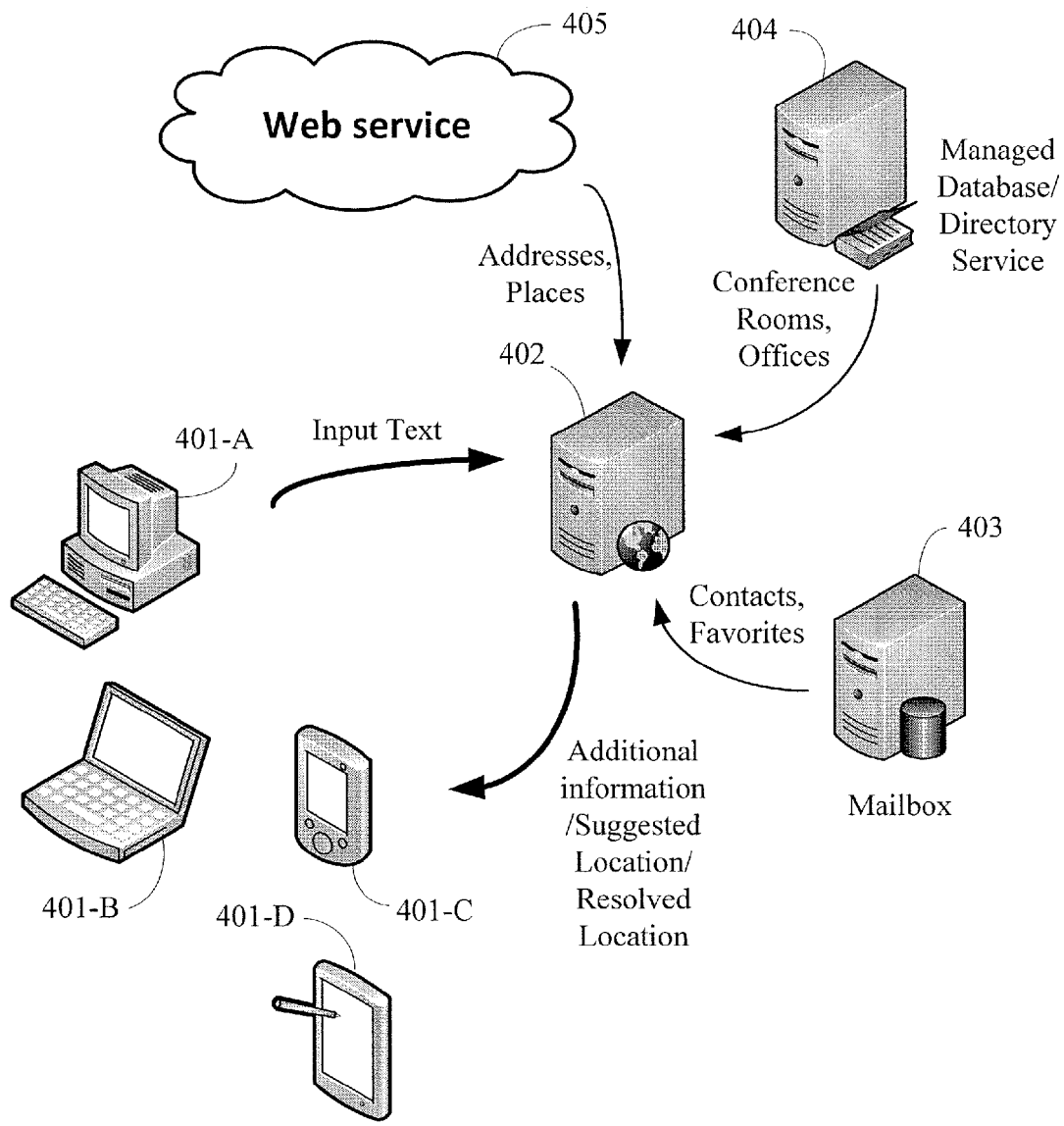
FIG. 4 shows an operating environment in which embodiments of the invention may be practiced.

Referring to FIG. 4, a user computing device, such as a personal computer 401-A, laptop 401-B, smart phone 401-C, tablet 401-D, and the like can display a PIM application interface (e.g., user interface 108 of FIG. 1). The user computing device may communicate directly with various location information sources over a network (e.g., network 102 of FIG. 1) or through a web server 402. The sources of location information can include, but are not limited to, a mailbox server 403, a managed database or directory service 404, and a web service 405.

When the user opens a meeting item to view the item from within the browser, the webmail service requests the meeting item from the mail server, which includes the content and metadata relating to the meeting item. In the meeting item provided by the mail server, the contact information regarding the meeting location may not be available or only be minimally available at the time of the request due to the location contact not being stored (statically or) locally. Rather, so long as the place id is provided, additional information can be obtained.

For example, the meeting item received by the user computing device may include a YPID (or a location URI) from the BING Phonebook service. When the recipient touches the location field, the webmail service (from user device 401) sends a request for additional data to the mail server (e.g., web server 402), which then communicates with the BING phonebook service (e.g., web service 405) to obtain information based on the YPID. The results received from the web service call are then provided to the user computing device (e.g., 401) for display.

The response from the web service can include additional data related to the location that was obtained using the place's id. For example, the business phone number, business home page (from a secondary source such as a phone book directory), personal home page (such as created by the business), and business address may be returned by a phone book services web service. This information can be presented to the user as part of the display with a pop-up or card as shown in FIG. 3.

Not only can looking up the location information provide more accurate information about the location of an event or meeting to recipients of a meeting or event request, but in some cases the dynamic data can resolve ambiguities for the user choosing the meeting location. For example, the user can ensure the right location is being referred to by checking the address within the meeting item user interface. Additionally, outdated contact information can be avoided or minimized by dynamically retrieving the most current information from a server in real-time.

In one embodiment, when a location is input via the location input field of a meeting item form and the location is associated with a known source, the location is displayed with a designation indicating that the location is from a known source. In one embodiment, the designation can be a symbol or image (e.g., an icon). In another embodiment, the designation can be the bolding, coloring, and/or underlining of a known location (the switch from entered text to a bold/color changed/underlined text may also indicate that the location is a resolved location and has been resolved).

Figure 5A:
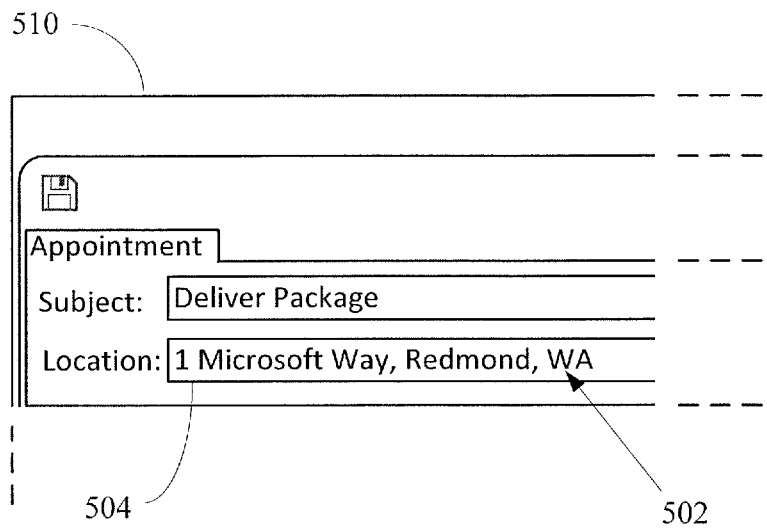
FIGS. 5A and 5B show an example user interface illustrating a designation of a resolved location according to an embodiment of the invention.
Figure 5B:
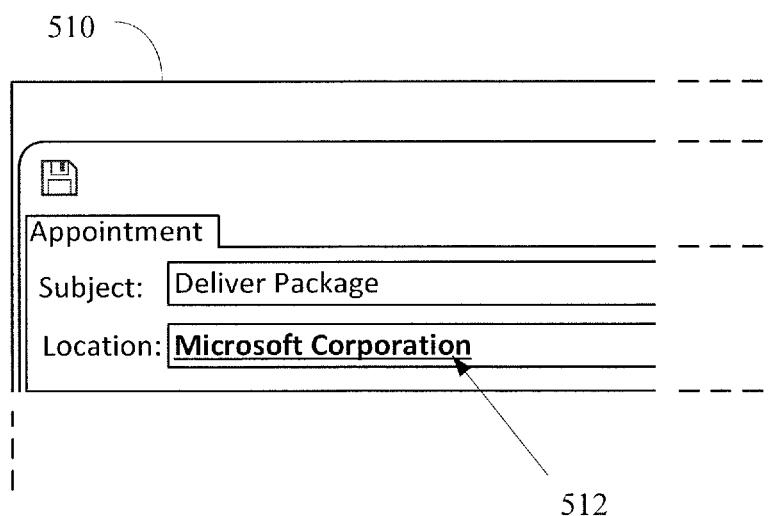

An example is shown in FIGS. 5A and 5B. Referring to FIG. 5A, an address "1 Microsoft Way, Redmond, Wash." 502 may be input to a location input field 504 of a meeting item 510. As shown in FIG. 5B, once the text has been resolved, in this example, the address has been replaced with a display of the place name "Microsoft Corporation" 512 that is shown bold and underlined. The place name may appear, for example, when the data object of the resolved location returns a place name as the string name. Of course, it should be readily apparent that the address may continue to be displayed and/or other indicia can be presented to a user for designating that the text is resolved.

The resolving of the location input to the input field can be a determination that the location is an existing contact and has a unique id associated therewith (e.g., an identifier that is a distinctive indicator for the contact). In another embodiment, the resolving of the location that is input to the input field can include associated geo-coordinates of the location with the place name. The geo-coordinates of the location can be included as part of the additional information about a location requested from a known source. The known source from which the geo-coordinates are obtained can be a same or different source as requested during displaying information about a location (such as provided in a location contact card).

According to certain embodiments of the invention, geo-coordinate resolved locations are obtained in order to associate geographical information with a place name. In one embodiment, a freeform text location that is input to a location input field of a meeting item form is resolved using a location service so that the location has geo-coordinates associated with it.

"Geo-coordinates" refer to geographical location coordinates of latitude and longitude, and may also further include altitude.

Currently, the location or street address associated with a meeting item such as a meeting request, appointment or contact item is simple freeform text, for instance, "My Office," "Jen's House," or "Coffee Shop" place name, or the "1 Microsoft Way, Redmond, Wash." street address shown in FIG. 5A.

Certain embodiments of the invention resolve a freeform text location with a location service so that server or client application can discover or infer the actual physical position where the meeting or appointment will take place. As previously described with respect to FIGS. 5A and 5B, when typing a location into the location field 504, the place name or street address is initially in a freeform text 502. At this point, the application has little information about this address and whether the address represents a valid address/location.

By resolving the location (e.g., as shown in FIG. 5B), the client application checks the freeform text against a source, and finds and assigns geo-coordinates to represent the geographical position of that location. This "resolved" address is a location resolved address. The location resolved address may also be a resolved address in the traditional sense such as common with email addresses where the email address is validated by checking a mailbox or phone book database (either a local copy or a request to a server).

Figure 6:
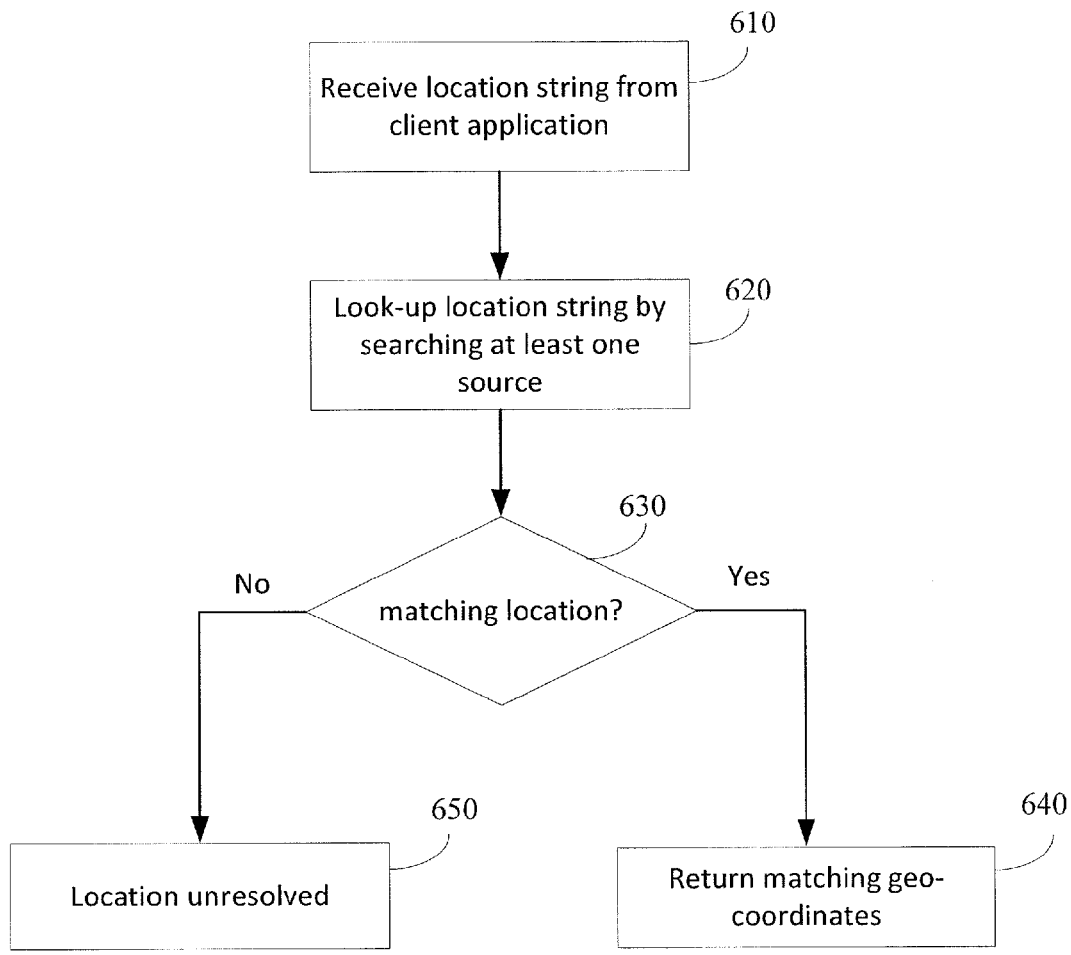
FIG. 6 shows a process flow for resolving a location according to an embodiment of the invention.

FIG. 6 shows a process flow for resolving a location according to an embodiment of the invention. Referring to FIGS. 4 and 6, for a client/server configuration such as the web browser/mail server configuration described above, a location string is sent from the client application (at a user computing device 401) to the server (e.g., web server 402). Text (or character strings) input via the location input field of the user interface can be received by a web server 402, which then performs any web service calls and/or requests to a server's API to obtain the geo-coordinates for the location.

When the server 402 receives the location string (610), the server performs a look-up process (620) by searching at least one source. The at least one source can include the mailbox server 403, the managed database or directory service 404, the web service 405, or a combination thereof. During the look-up process (620) the location string is compared against the one or several sources to determine if there is a matching location (630). If a matching location is found, then the corresponding geo-coordinates are returned (640). The geo-coordinates can be returned along with the location text as a "resolved location." The suggested location and/or resolved location may be returned to the user computing device 401 from the web server 402. If no satisfactory match is found, then the location remains unresolved (650).

The text input via the location input field can be freeform text or text from a location suggestion as provided in accordance with some embodiments of the invention. The resulting data object includes a string name and geo-coordinates. The string name can be associated with contacts, user-selected favorites, conference rooms and offices, or physical addresses, for example.

When resolving the input text to obtain a data object with geo-coordinates, contacts and favorites can be checked against a mailbox server 403; conference rooms and offices can be checked against a managed database or directory service 404, and addresses can be checked against a web service 405. The web service 405 can provide external location services, such as BING Maps, for looking up addresses and names of places. For instance, in the example shown in FIG. 5A, the location string "1 Microsoft Way, Redmond, Wash." can be used to look up geo-coordinates from BING Maps and the BING Maps API is capable of returning the corresponding latitude and longitude. Place names, such as "SeaTac" (the Seattle-Tacoma airport) can also be resolved through an external location service such as BING Maps.

According to an embodiment, as yet another enhanced location input field feature, location suggestions and/or an autocomplete is incorporated with the location input field of a meeting item. Location suggestions can be displayed in real-time to the user as an auto-completed entry, a dropdown list, pop-up window, a card, or any combination thereof. In one embodiment, the autocomplete can appear as a dropdown menu providing a listing of possible entries. The possible entries can be suggestions and/or more information to assist in selection of an appropriate location.

By providing suggestions, a user can search for a location to use as a meeting location when creating a meeting item without opening another program or browser window in order to determine the correct name or address of the desired place. In addition, the suggestions can be used to help smartphone users and other touch-screen display users reduce the amount of typing necessary to input a location and make location entry less cumbersome.

According to certain embodiments, the suggestions can be in the form of an autocomplete feature that displays within the input field or as a dropdown list of suggestions. Some embodiments provide real-time suggestions of locations related to the text that a user is currently typing on a meeting request, appointment or other user interface. In some embodiments, the location field for the meeting item resembles a "live" search bar that can pass through text strings to a web service and provide a dropdown list of results.

Autocomplete and dropdown list of suggestions are features already present in other interfaces that are common to users such as search engines, browsers and source code editors. For example, search engines such as BING and GOOGLE (a registered trademark of Google Inc.) provide suggestions not only before a character is entered (the suggestions generally including popular search terms), but also a list that updates as each character is input to the search field.

In the context of email and scheduling applications, autocomplete features currently provide suggestions for email recipients based upon the characters that a user has typed into the "To" field (also referred to as the recipient field).

For example, if a user were to type the characters "Ja" into a recipient field, the user may be presented with a list of potential recipients whose names and/or email addresses begin with the characters "Ja" (e.g., Jason, Janet, James, etc.). The suggestions are based upon the characters that the user has typed and are generally based on a correspondence (e.g., match) between the user inputted characters and respective contacts' names and/or email addresses (e.g., as stored in an electronic address book).

The autocomplete and dropdown list can be provided in a client-server configuration (such as provided by search engine applications) or a client only configuration (where local engines perform the autocomplete using information stored in a local database). Operating environments such as shown in FIGS. 1 and 4 may be utilized.

Various embodiments include completion suggestions based on one or more of street address, place names, specific room locations within a building, freeform text and aliases (with corresponding location stored or inferred), recipient contact information, and recently used locations.

Figure 7A:
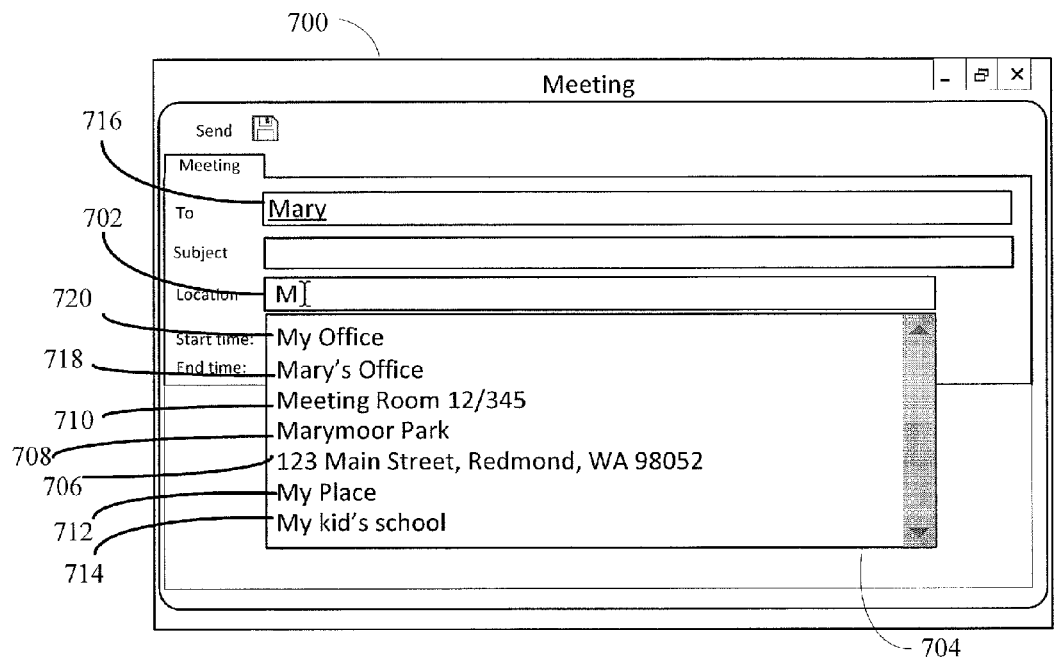
FIG. 7A shows an example user interface having location suggestions according to an embodiment of the invention.

FIG. 7A shows an example user interface having location suggestions according to an embodiment of the invention. Referring to FIG. 7A, a meeting item form 700 can include an enhanced location input field 702. When a user interacts with the location input field suggestions can be surfaced (e.g., displayed) to the user. For example, a dropdown menu 704 of suggestions can be provided. The suggestions may be provided before the first character is input and then updated and/or modified as additional characters are input into the location input field 702.

For the example shown in FIG. 7A, the letter "M" is input into the location input field 702 and a list of suggestions is provided in a dropdown menu 704.

In certain embodiments, suggested locations from the known sources can have the designation indicating that the location is from a known source. In other embodiments no additional designation is used (particularly where all the suggestions are provided from the known source(s)).

Where there is a drop-down menu, the locations from the known sources described with respect to displaying dynamic data about a meeting location can also be presented.

Figure 7B:
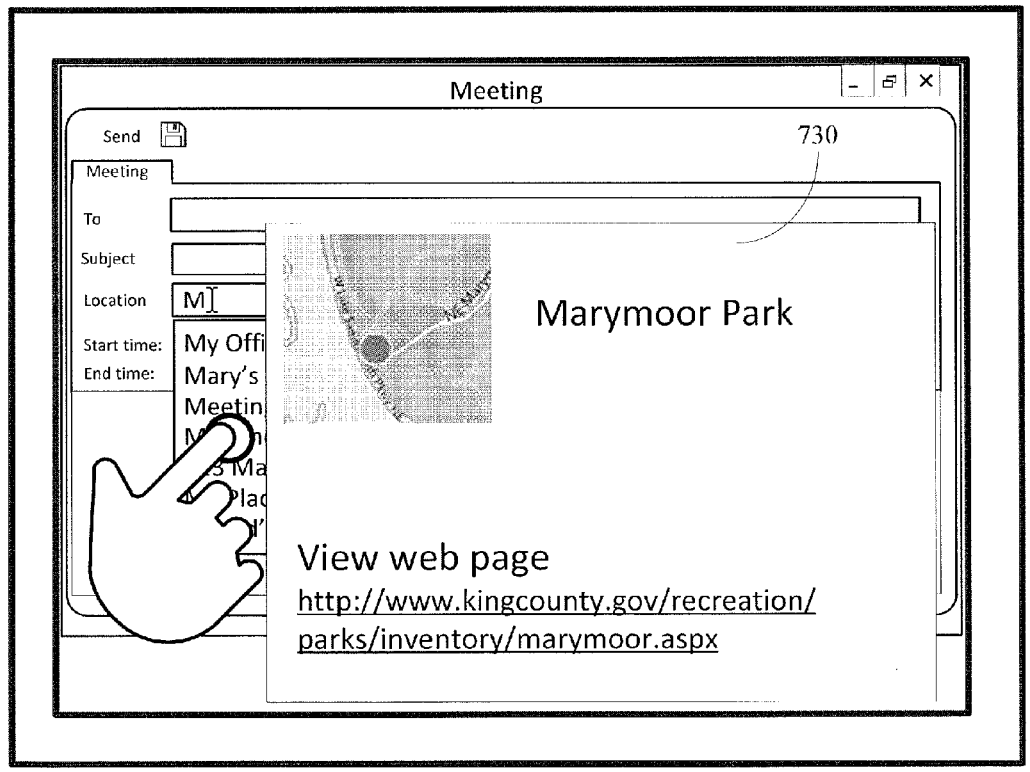
FIG. 7B shows an example user interface having location suggestions and displaying a location contact card according to an embodiment of the invention.

Each suggestion from a known source may have a location contact card available for display upon interaction with the place name in the list (or once accepted in the location input field). For example, FIG. 7B shows an example user interface having location suggestions and displaying a location contact card according to an embodiment of the invention. As shown in FIG. 7B, a user touching "Marymoor Park" can view the contact card 730 associated with the location.

The real-time autocomplete suggestions may also be considered resolved locations. For example, the autocomplete suggestions can be provided as pre-verified locations. In addition, in an embodiment, the autocomplete entry may be provided as a data object having geo-coordinates.

The sources of the suggestions provided in the dropdown menu can include one or more of suggestions based on street address ("123 Main Street, Redmond, Wash. 98052") 706; place names ("Marymoor Park") 708; specific room locations within a building ("Meeting Room 12/345") 710; freeform text ("My Place") 712 and aliases ("My kid's school") 714 (with corresponding location stored or inferred); recipient contact information 716 ("Mary's Office" 718) and sender contact information ("My Office") 720; as well as recently used locations, which may control the overall order of the items according to usage history.

The suggestion "My Office" 720 can be resolved based on the sender and the location can resolve to the organizer's office. For example, the organizer can input "my office" in the meeting item form and the recipients will receive the details "Jon Doe's Office building 12 room 34." The suggestion "Mary's Office" 718 will resolve to the attendee's office. The suggestion "Meeting Room 12/345" 710 obtained from an address book can resolve to the conference room address. The place and address suggestions "Marymoor Park" 708 and "123 Main Street, Redmond, Wash. 98052" 706 may resolve to geo-coordinates. In addition, the suggestions "My Place" 712 and "My kid's school" 714 can be places given a name by the user and may be resolved to the details (including geo-coordinates) associated with the favorites/contacts.

Details of the suggestion sources are provided in the sections below.

Street Address and Place Names:

For suggestions based on street address and place names, street addresses can be resolved to proper postal addresses with an external web service such as BING Maps API. Place names (e.g., SeaTac, Nearby Starbucks) can also be resolved against external web services such as the BING Maps API, BING Phonebook API, and even Facebook.

In one embodiment, a user's current location can be used (upon the user granting permission). Where the user allows their current location to be used, the suggestions can include the user's current location to facilitate selection/look-up of the addresses for the place name or street address. In further embodiments, the suggestions can be ranked according to the distance from the user's current location. For example, the user's current location may be used to find a nearest coffee shop.

Specific Room Locations within a Building:

For suggestions based on specific room locations within a building, such as conference or meeting rooms, the location of conference rooms or other specific rooms in a building can be resolved against a list of rooms in a database such as handled by a directory service. In addition to resolving the room locations in a manner that verifies that the room exists, the room locations can be location resolved with geo-coordinates.

Locations such as "Conference Room 32/3363" are meaningful to some people but do not, on their own, have any special meaning to computer systems. In order to acquire or calculate maps, directions, travel time and other location based information related to these inside-building locations, some embodiments provide additional data associated with a particular location of a room.

In one embodiment, geo-coordinates are designated for places inside a building such as rooms, offices, conference rooms and other areas of interest; and these geo-coordinates are used so that computer systems can understand the locations and therefore be able to calculate distance, travel time, navigation, and the like.

Similarly to how buildings or houses can be assigned geo-coordinates to describe their position in a neighborhood, the rooms in a building or house can be assigned coordinates to describe their position within the building.

For instance, "Conference Room 32/3363" or "Cafeteria" or "Auditorium" may be specific locations within a building. Certain embodiments of the invention assign an address or coordinates for each of these rooms within a larger building or address. The coordinates may be used to navigate to the meeting location or provide further query and calculation capabilities.

Instead of only using geo-coordinates for places and buildings (such as through web services like BING Maps), embodiments also use geo-coordinates designated for places inside a building such as rooms, offices, conference rooms and other areas of interest.

In accordance with various embodiments, geo-coordinates are collected and associated with rooms of a building (or other spaces within a building) including rooms, offices, conference rooms and other areas of interest. By having geo-coordinates assigned at a room level, the current features available using geo-coordinates can be performed with respect to the room-level (as opposed to building or street level). For example, it is possible to obtain in-building navigation and/or directions.

In addition, by providing coordinates at a room-level granularity, it is possible to find a room of interest near a particular location. The query for a room of interest may be to find a nearest conference room, printer room, kitchen, or other room in a building. To facilitate a search for a nearest room a user's current location (after receiving permission to retrieve information regarding the user's current location) and coordinates of rooms located around the user can be used. In another embodiment, the user's current location may be inferred from contact information such that the user's actual location is not tracked or used; rather, only a location the user indicates as part of the user's contact information may be used.

By knowing or inferring a user's current position and knowing the position of rooms around the user, a nearby conference room may be determined. When other conditions, such as availability, are included in the computing of conference rooms near the user, a nearby available conference room may be determined. For example, conference rooms may be represented by resource mailboxes and can optionally have an address associated with it.

In a specific implementation, a room's resource mailbox can include the name (how it is referred to externally to people in the building) and office (the room number designation). In a further specific implementation, an address (e.g., a street address, state, postal code, and country) can be included as part of the mailbox.

The conference room's address stored in the directory/mailbox (e.g., directory service 404 and/or mailbox/mailbox server 403 of FIG. 4) generally refers to the main address of the building. According to embodiments of the invention, a new property can be included in as part of the stored contact for the building room. This property can be referred to as a "GeoCoordinates" property, and can be defined in order to store latitude, longitude and, optionally, altitude, for example, of specific offices or conference rooms. By providing the GeoCoordinates property, the geo-coordinates of the room can be accessed and used in navigation and calculations by a computer system.

Once conference rooms are assigned with their individual coordinates a mail server (e.g., web server 402 of FIG. 4) can access and use them, for instance, to provide directions to a meeting place using the public BING Maps API or to calculate the distance between rooms or between client and rooms of interest.

Freeform Text and Aliases:

Commonly used freeform text such as "My Office," "Your Office," "Jon Doe's Office" can be inferred based on the sender and recipients of the meeting request and their office location retrieved from a mailbox, directory service, vCard (a standardized file format for electronic business cards) and/or a corresponding meCard (contact information encoded as a barcode).

Similarly to freeform text, users may create aliases (or "favorites") for locations they frequently use, like "Home," "Work," "Gym," or "Kid's School". In some cases, aliases (or favorites) may be created by giving a custom name to a location that has just been resolved. In other cases, it is possible that the user's device (via a software program or application) creates a custom name to a location by naming and saving the user's current location.

For resolving the freeform text, meeting locations can be inferred based on entered location information (which can be parsed into prepositions and nouns), sender information, and recipient contact information.

As mentioned above, it is common for organizers of meetings to define locations such as "My Office," "Your Office," "My house," or some other freeform descriptive text. Such location strings currently provide little information in terms of actual global position (geo-coordinates). By resolving the freeform text with geo-coordinates, it is possible to provide enhanced features such as directions to the meeting.

According to an embodiment, contact information associated with attendees and the organizer, as well as words from the location text, is used to infer the actual geographical location in which the meeting will take place.

Figure 8A:
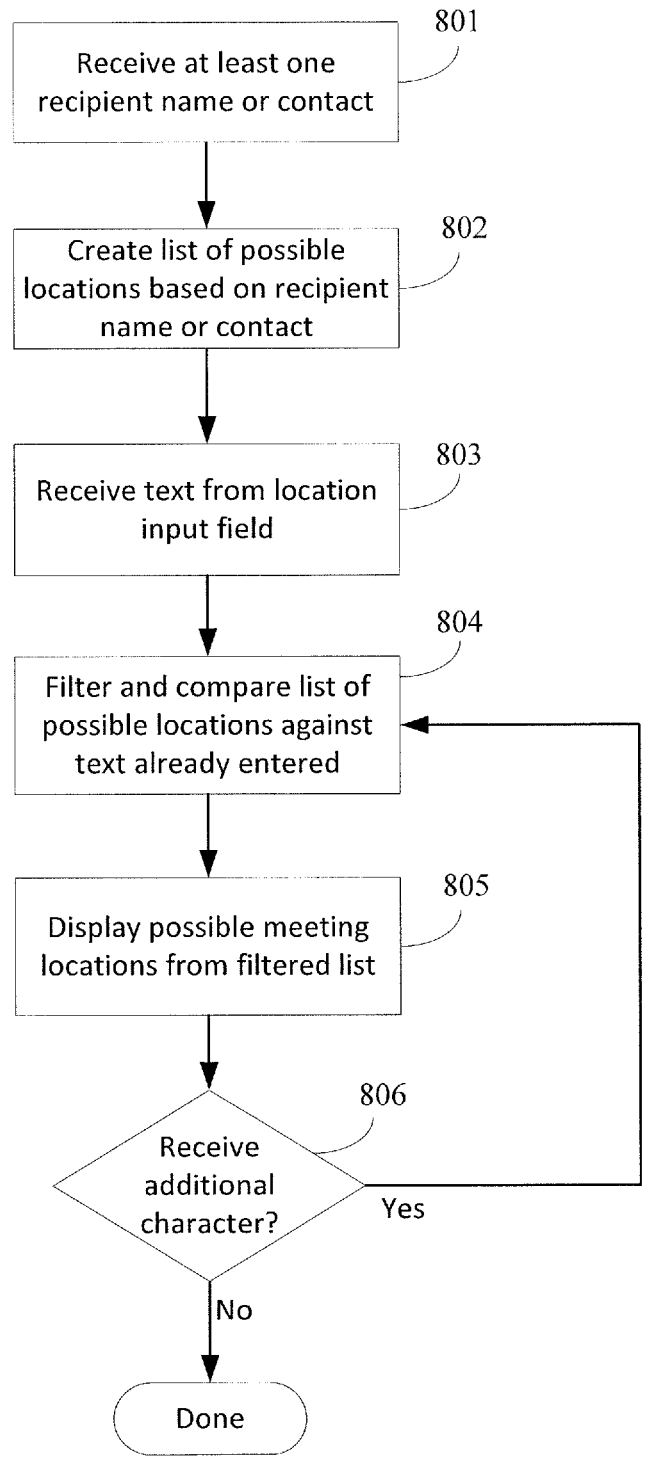
FIGS. 8A and 8B show process flows for inferring a meeting location according to certain embodiments of the invention.

FIG. 8A shows a process flow for inferring a meeting location according to an embodiment of the invention. Referring to FIG. 8A, when at least one recipient name or contact is received in a meeting item form (801), a list of possible locations for the meeting item can be created based on the recipient name or contact (802). To create the possible locations, each of the names on the list of attendees input by a user within a meeting item can be looked up and the corresponding contact information is searched for possible addresses and offices. The contact information may include, but is not limited to, a home address an office number, and a business address. The contact information can also include each location's respective geo-coordinates.

The list of possible locations for the meeting item may be displayed in a dropdown menu when the user interacts with a location input field of the meeting item form and may optionally be displayed before any text is entered. As text is received from the location input field (803), the list of possible locations is filtered for potential matching locations (804). The filtered list is displayed (805), and as each additional character is received (806), the list is further filtered (804) and displayed (805).

In a specific embodiment, while the attendee's list is populated, a list of possible locations is created based on the attendee's names. For instance, if Mary (who has a home address) and Sylvia (who has an office number) are invited, possible suggestions could be "Mary's Home" and/or "Sylvia's Office". When the user types a freeform text in the location field, some of the suggestions may be filtered out of the list of suggestions by using the text already typed. For instance, if the user types "S", then "Sylvia's Office" could show up in the list of suggestions, allowing the user to pick one of the suggestions from the list.

Figure 8B:
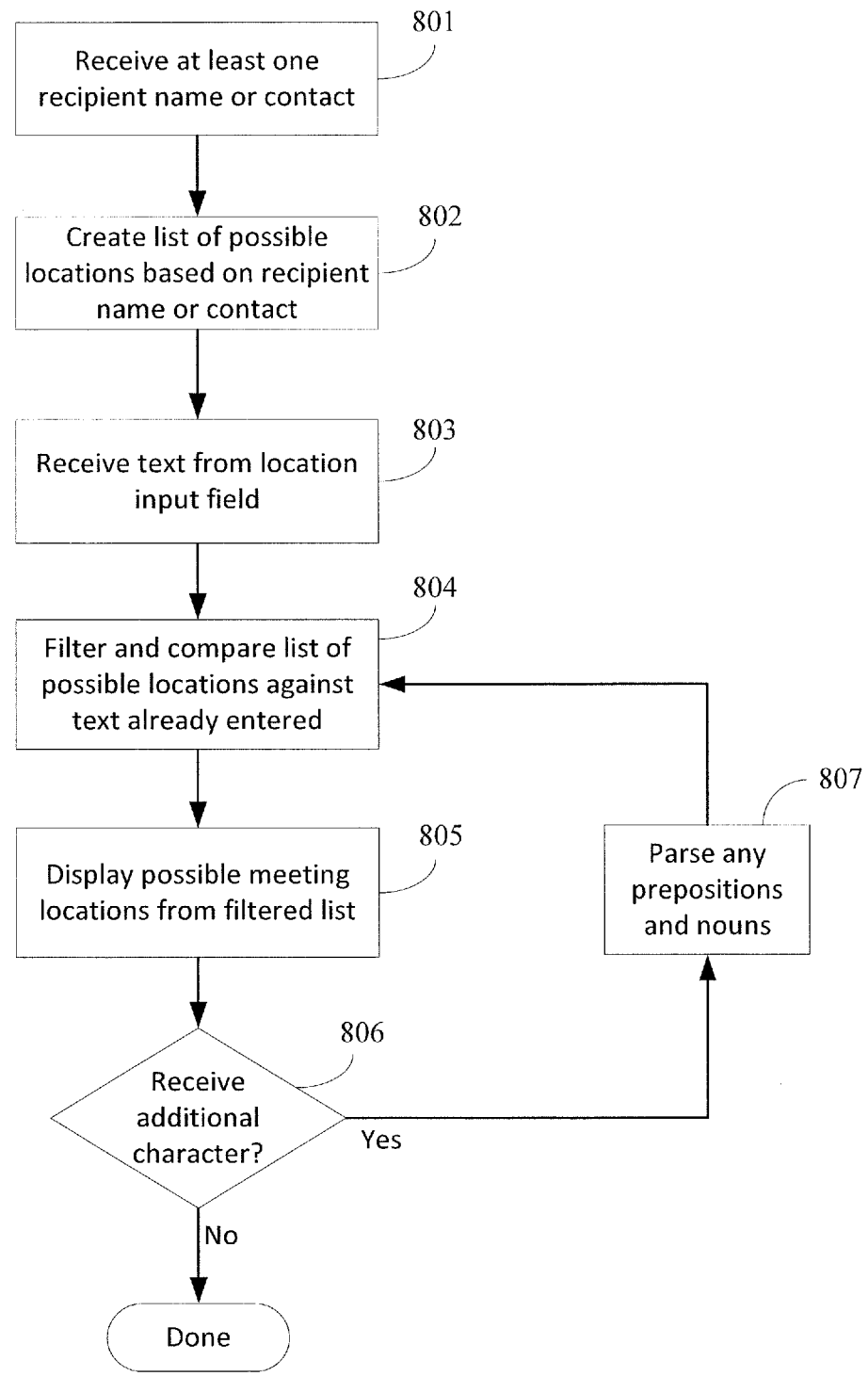

In a further embodiment, the freeform text is parsed for prepositions. For one such embodiment, such as shown in FIG. 8B, as the text is received from the location input field (803), any prepositions and nouns in the location text are parsed (807). Then during the filtering and comparing (804), the list of attendees of the meeting (as well as the organizer) and their corresponding contact information are filtered according to any preposition and nouns found in the text. The filtered list of possible locations are then displayed (805).

By parsing prepositions and nouns separately, suggestions can arise based on the prepositions such as "My" and "Your" in addition to the names being typed. For example, "My Office", "My House", "My . . . ", referring to the organizer can be resolved to include the information about the organizer; and "Your Office", "Your House", "Your . . . ", referring to the attendee can be resolved to include the information about the attendee.

According to an embodiment, the user is able to spend less time typing (especially in mobile devices) by selecting from a pre-populated list of suggestions. In addition, the server (e.g., mail server or web server 402 of FIG. 4) can link the location information to an actual address and geo-coordinates such as "Mary's home address". This capability can help other features to enhance the user experience, for instance, by calculating directions to the location or calculating travel time to such meeting.

For example, as mentioned above with respect to FIG. 7A, the suggestion "My Office" 720 can be resolved based on the organizer, Jon Doe, and the location can resolve to the organizer's office. In that case Mary can receive the details "Jon Doe's Office building 12, room 34." The suggestion "Mary's Office" 718 can resolve to Mary's office location and the other attendees (and the organizer) can receive the details corresponding to Mary's office.

According to an embodiment, by associating a freeform text or alias with the actual place, the location referenced by freeform text or alias can be kept up to date through the method of displaying dynamic data about a meeting location. For example, the freeform text or alias can resolve to a known location having an associated id that can be used to look up the most recent data from a source. Then, when a recipient (at a same or a later date) views the location information, the most up to date information can be displayed as described with respect to FIG. 2.

For instance, by referring to Sylvia's office, it does not matter if Sylvia's office changes because the meeting item will have the necessary data (Sylvia's id) to identify where the new office is. This can be accomplished by storing Sylvia's contact information with an id for use in a dynamic look-up instead of a string.

Contacts—Recipient and Sender Contact Information:

There can be multiple addresses associated with a contact. For example, home and work addresses may be associated with a contact. Suggested locations can include locations associated with a contact. By further including geo-coordinates with the home and/or work addresses of a contact, the contact can be associated with geo-coordinates.

According to certain embodiments, a user can use a contact as part of the meeting location, for example: "Jane Smith's Home." Then, a user entering "Jane Smith's Home" can be provided location suggestions from Jane's contact information.

History—Recently Used Locations:

Currently, the location or street address associated with a meeting request, appointment or contact items have no memory of previously used locations. For instance, if a person frequently schedules meetings at "Conference Room 32/3363," "The Coffee Shop" or "Kid's school" these locations would be typed in each time the person creates a meeting or appointment. According to an embodiment, frequently used locations can be stored and displayed as suggestions when a user types in the location input field.

Certain embodiments can provide a similar user experience for the location input field as with the "To" field. For example, when typing an email address (on a message or meeting) the user may be presented with possible email addresses that he/she used in the past. The list of frequently/recently used addresses helps the user to not have to remember an exact full address and also saves time by avoiding or minimizing the occurrences of having to type the full address again. Embodiments provide a similar feature for the location input field. According to an embodiment, the most recently used locations are stored and then displayed as suggestions to the user when the user is creating/updating a meeting or event.

According to certain embodiments, not only can information regarding who was a recipient of a user's past communication be stored for use in providing potential recipient(s), but this information as well as information regarding locations used as a meeting location for a meeting item can also be stored for use in providing potential locations for a communication or request that the user is presently preparing. For example, in one embodiment, based upon the user's communication history, potential locations for a meeting item the user is presently preparing can be identified and presented to the user.

It will be appreciated that in some embodiments, the user's history and/or the information derived from that history (such as the potential location(s)) can be available across devices (e.g., personal computers, mobile devices, and the like) and/or applications (e.g., a desktop email client, a web client). According to one embodiment, the list of most recently used locations can be stored on a server so that the same list is available on all clients (e.g., desktop, mobile). The list of most recently used locations can be stored in a history cache or database.

In certain embodiments, frequently used locations can be shown in the autocomplete suggestions or be used to rank/weight the autocomplete suggestions. The rankings can be carried out for suggestions presented from the various sources as described above.

Figures 9, 10:
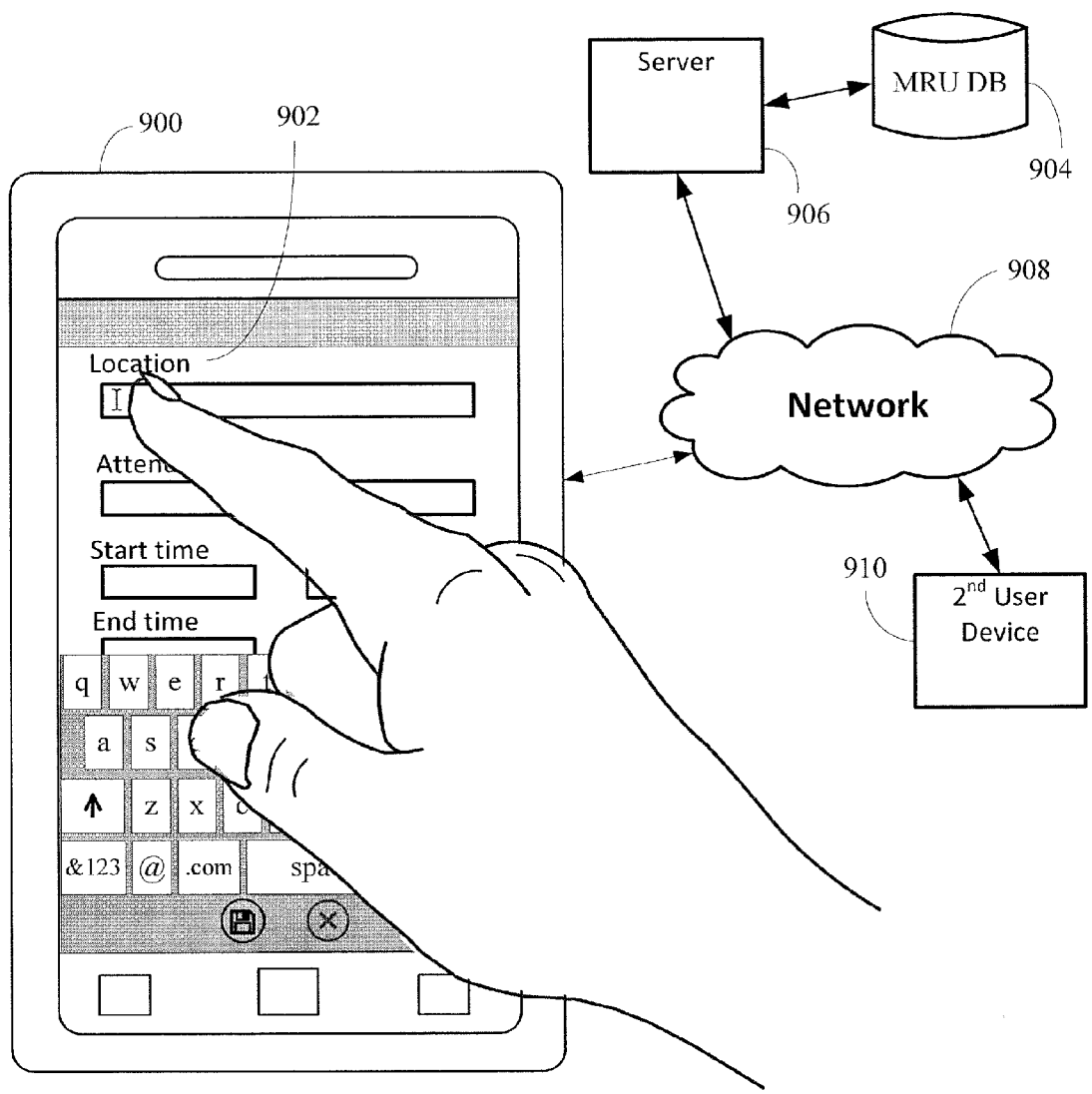
FIG. 9 shows an operating environment according to an embodiment of the invention.
FIG. 10 shows a representative table of a MRU list.

FIG. 9 shows an operating environment according to an embodiment of the invention. Referring to FIG. 9, a user may use a PIM application on his/her computing device 900 to schedule a meeting. When the user is entering location information within a meeting item 902, certain embodiments suggest, and display to the user for selection, the most recently used (MRU) locations in order to help reduce the amount of typing the user performs to enter in a location within the meeting item 902.

Further embodiments also rank and suggest the MRU locations according to the most frequently used locations. To provide the MRU locations, previously used locations can be stored in a MRU database (DB) 904 that can be connected to a server 906. The MRU DB 904 may be directly connected to the server 906 or connected to the server over a network such as network 908. In one embodiment, the server 906 and MRU DB 904 can be a mailbox server.

The MRU locations input by the user (and stored in the MRU DB 904) can be synced to the user's other devices 910 via the server 906.

In one embodiment, to carry out the suggestions of most recently used locations, the creation and maintenance of a MRU list that can be stored locally on a computing device 900 and/or on a server 906 (having MRU DB 904) and/or stored using a cloud service are performed.

FIG. 10 shows a representative table of a MRU list. Referring to FIG. 10, a MRU list contains location data with an associated relevance index. The relevance index indicates how often that location is used. According to some embodiments, the more frequent entries can be ranked and moved up the list as being more relevant to the user.

Figure 11A:
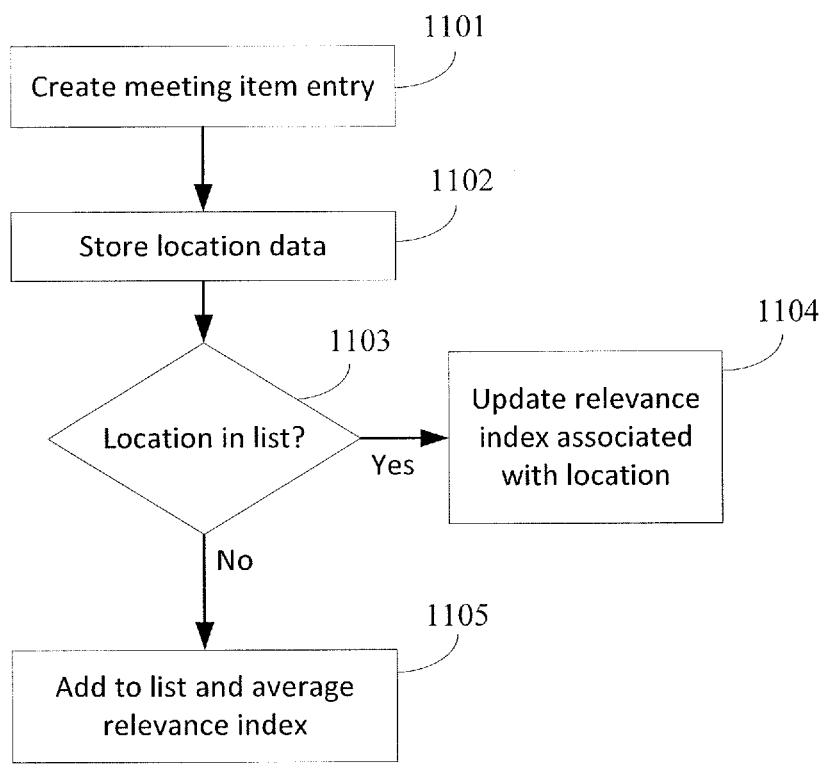
FIG. 11A illustrates a method of maintaining a MRU list according to an embodiment of the invention.

FIG. 11A illustrates a method of maintaining a MRU list according to an embodiment of the invention. When the user saves or sends a meeting item, a meeting item entry can be created (1101) and the location data of that meeting item stored (e.g. in the user's mailbox) 1102. The user's mailbox may be a local mailbox or a server mailbox.

The location is then compared to the MRU list to determine whether the location is on the MRU list (1103). If the location already exists, the corresponding relevance index associated with that location entry is updated in relation to other MRU locations on the list (1104). If the location does not already exist, then the new location entry can be added to the MRU list along with a relevance index (1105).

Figure 11B:
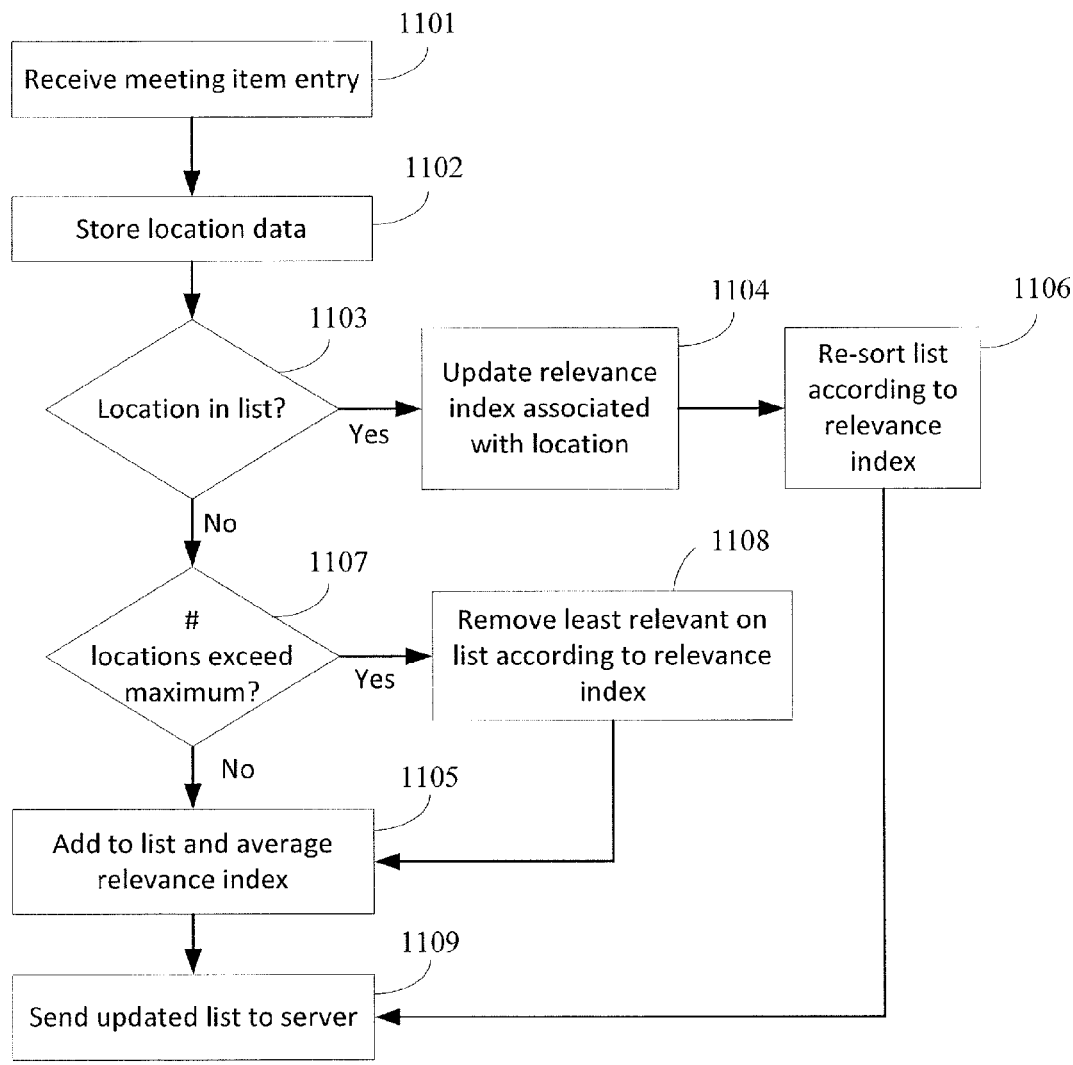
FIG. 11B illustrates a method of maintaining a MRU list according to an embodiment of the invention.

In a further embodiment, additional features can be provided for maintaining the MRU list. FIG. 11B illustrates a method of maintaining a MRU list according to an embodiment of the invention. Similar to the process shown in FIG. 11A, when the user saves or sends a meeting item, a meeting item entry can be created (1101) and the location data of that meeting item stored (e.g. in the user's mailbox) 1102. The user's mailbox may be a local mailbox or a server mailbox.

The location is then compared to the MRU list to determine whether the location is on the MRU list (1103). If the location already exists, the corresponding relevance index associated with that location entry is updated in relation to other MRU locations on the list (1104). In some embodiments, when saving the data, the list can be resorted according to relevance index (1106). In some embodiments, the list can be resorted during visualization (displaying) of the data.

If the location does not already exist as an entry of the MRU list, then a determination can be made whether the number of entries on the MRU list exceeds a predetermined maximum number of entries (1107).

If the number of entries exceeds the maximum, then the last one on the list (i.e., the least frequently used location/least relevant according to the relevance index) can be removed (1108), and the new location entry is added to the MRU list along with a relevance index (1105). If the number of entries does not exceed the maximum allowed, the location entry is simply appended to the MRU list with an average relevance index (1105).

The relevance index may be an average and/or normalized value. For embodiments using a normalized value, the normalization of the relevance of locations can be configured such that recently used locations climb faster (obtain a higher relevance index faster) and no longer used locations decay faster (obtain a lower relevance index faster).

In some embodiments, the MRU list can be an unbounded list of entries such that there is no maximum number of locations and steps 1107 and 1108 may be omitted (such as shown in FIG. 11A). For an unbounded list, if a location has been used at least once then it will be displayed as a suggestion. For both bounded and unbounded lists, the user may remove a location from the MRU list so that it is no longer displayed as a suggestion.

Optionally, the updated MRU list may be sent to the server and stored (1109). By storing the MRU list on a server, the list can be synced between multiple devices (e.g., computing devices 900, 910 of FIG. 9).

Figures 12A, 12B:
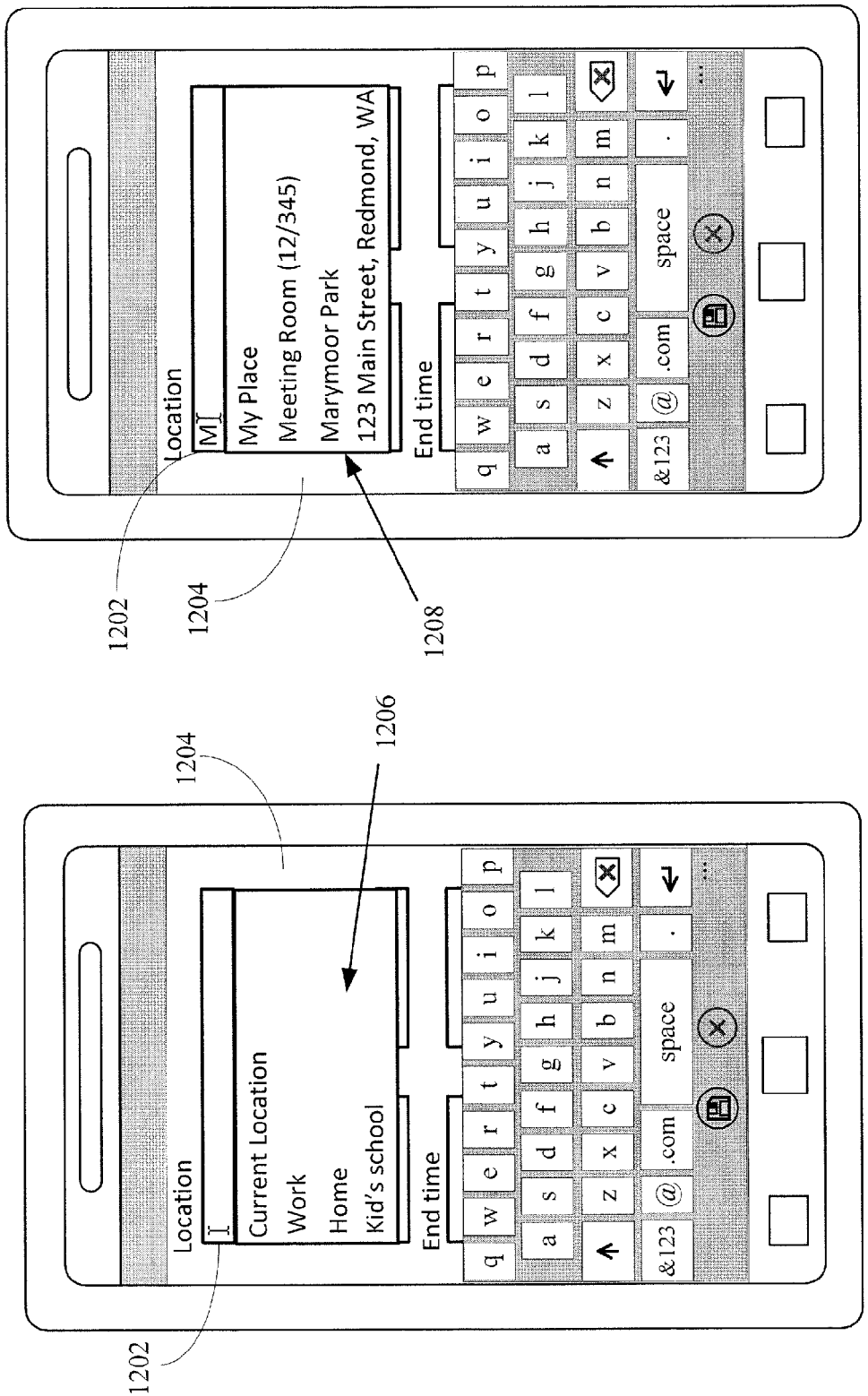
FIGS. 12A and 12B show example user interfaces in which location suggestions are presented according to an embodiment of the invention.

The MRU list can be used to suggest and display the most relevant locations in real-time to the user as the user enters text into the location input field of 1202 a meeting item 1204 such as shown in FIGS. 12A and 12B, which show example user interfaces in which location suggestions are presented according to an embodiment of the invention.

Figure 13:
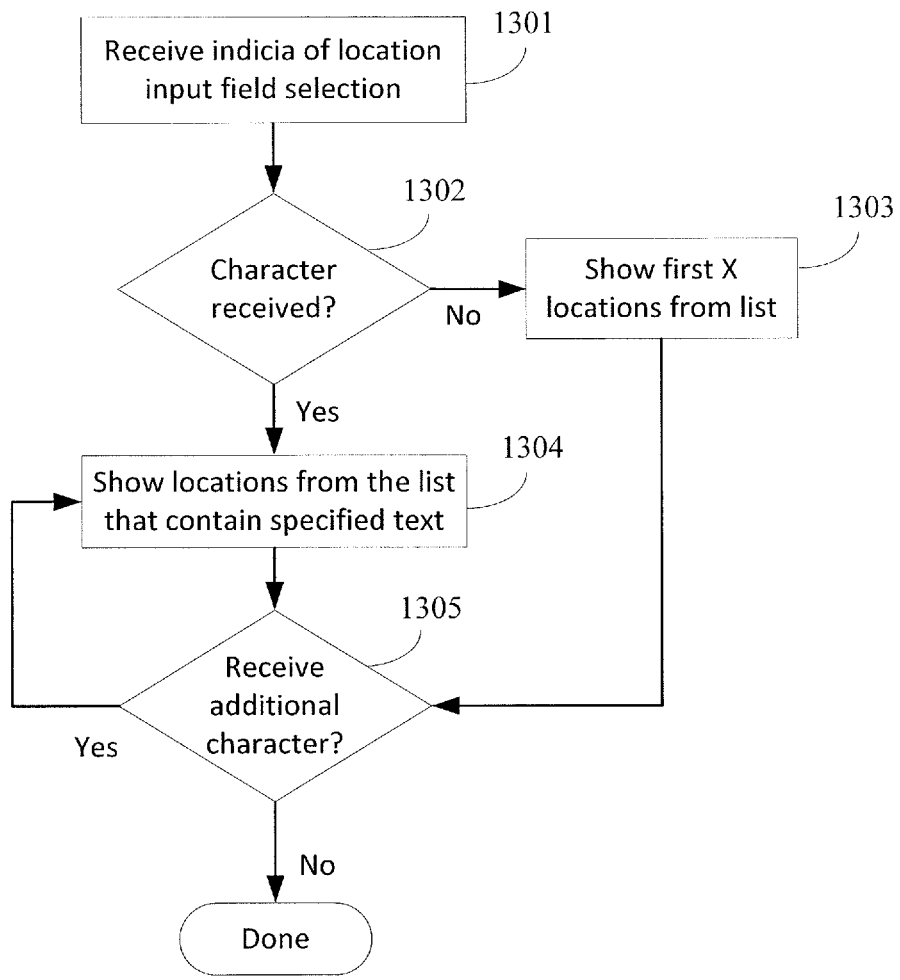
FIG. 13 shows a process flow for displaying suggestions using most recently used locations.

FIG. 13 shows a process flow for displaying suggestions using most recently used locations. Referring to FIGS. 12A-12B and 13, when a user interacts with a location input field 1202 of a meeting item 1204, an indicia of a location input field selection can be received (1301), which can begin the process for providing suggestions. The interaction by the user may be the selection of the location input field such as shown in FIG. 12A and/or the input of a character as shown in FIG. 12B. When the location input field is selected, the system determines whether a character is input (1302).

As illustrated in FIG. 12A, if the location field is empty, suggestions 1206 can be provided to the user (1303). The number of suggestions presented can be based upon the size of the device screen and/or other considerations. For example, the first X locations from the MRU list can be presented, where X is the number of suggestions that best fits the client screen. The fit can depend on the resolution of the screen as well as the particular device. For example, a screen displaying at a high resolution may be able to fit more text than a screen displaying at a lower resolution. Similarly, a desktop screen, because of its relatively larger size, may be able to fit more text than a mobile device screen. In the example shown in FIG. 12A, four suggestions are presented.

Once a character is received (1302), the locations from the MRU list that contain the entered text can be displayed (1304). For example, referring to FIG. 12B, if the user types "M" into the location input field 1202, suggestions 1208 including "My Place," "Meeting Room 12/345," "Marymoor Park," and "123 Main Street, Redmond, Wash." may be suggested and displayed in order of relevance. If the user continues to enter more text (1305), then the filtering may be repeated to display locations from the MRU list that contain the text with the newly entered characters (1304).

In addition to displaying dynamic data of a location and presenting suggestions for locations of a meeting, an embodiment of the invention contemplates the use of local map tiles as a visual identification of places.

User interfaces often display lists of people such as in contacts list, search results and other screens. Because people's names can sometimes be ambiguous or repeated, in order to help identify people, photographs may be displayed next to a person's name in a contact list.

For locations, instead of using a photograph of a location, embodiments provide a miniature map centered around a place's geographical location. The miniature maps can function as a visual aid to help users identify the location a user may be looking for. In addition to facilitating identification of an intended location, the miniature map can provide an aesthetic enhancement to a location or a list of locations.

The contact cards shown in FIGS. 3 and 7B include a map tile in accordance with an embodiment of the invention. In addition to the map tile's use as part of a contact card, the map tiles can be presented within a dropdown menu providing location suggestions. The location suggestion may facilitate the resolving of the location, for example, by presenting options to a user for selecting the address (and thus geo-coordinates) that can be associated with the place name. Because it is not always readily apparent by the address alone whether the correct location is selected, the local map tiles of an embodiment of the invention can aid in the user's selection.

Figures 14A, 14B:
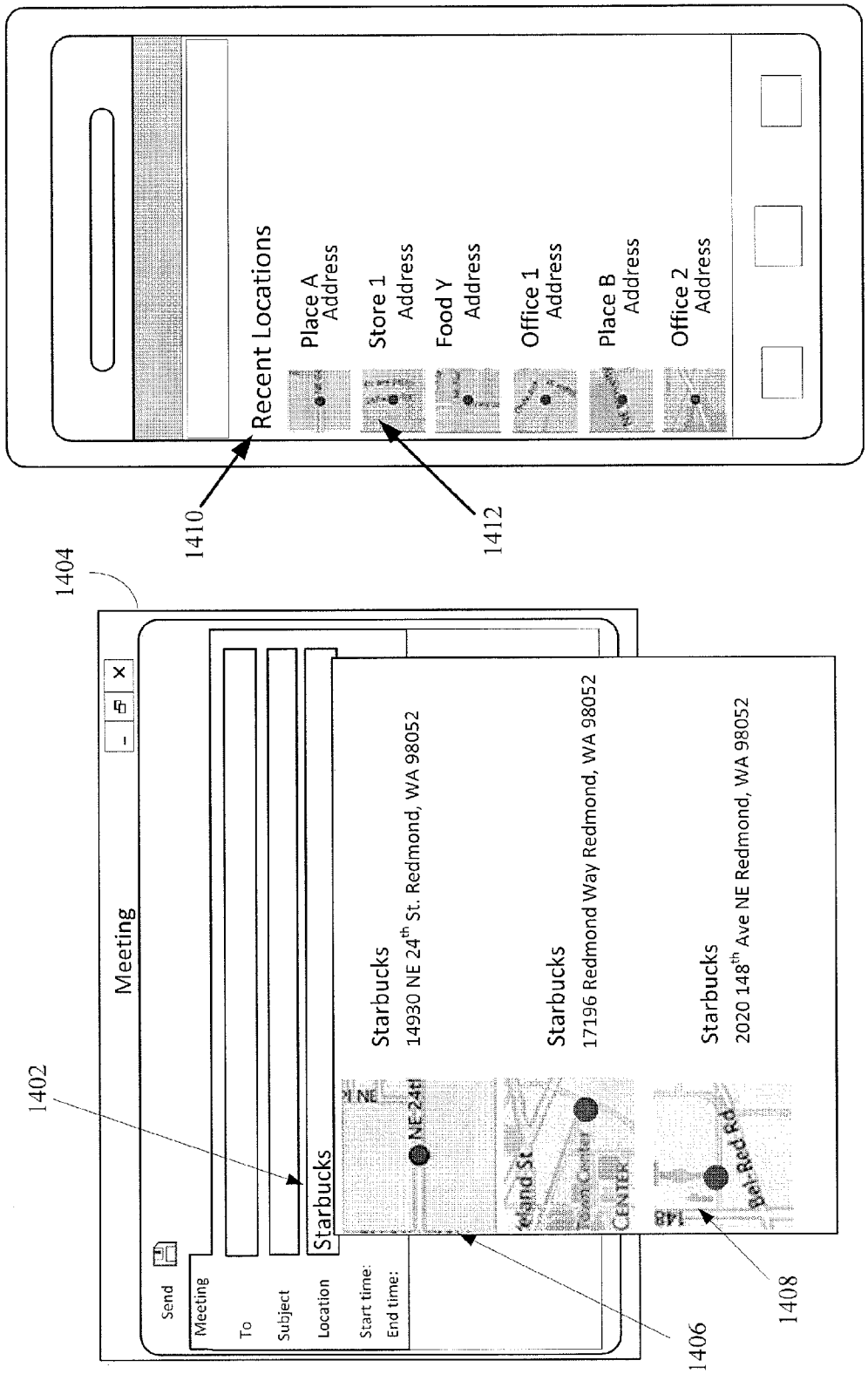
FIGS. 14A and 14B shows user interfaces in which map tiles are displayed according to an embodiment of the invention.

For example, as shown in FIG. 14A, if a user inputs "Starbucks" into the location input field 1402 of a meeting item 1404 in order to indicate a meeting at the store, a look-up of the location string by searching at least one source, such as a web service like BING Phonebook or Location services, can return a number of possible matches (see also FIGS. 4 and 6). The possible matches returned from the web service can be presented in a dropdown menu 1406 with the map tiles 1408.

FIG. 14B shows another user interface in which map tiles are displayed according to an embodiment of the invention. Referring to FIG. 14B, a location list (similar to a contact list) of recent locations 1410 can include map tiles 1412.

Figure 15:
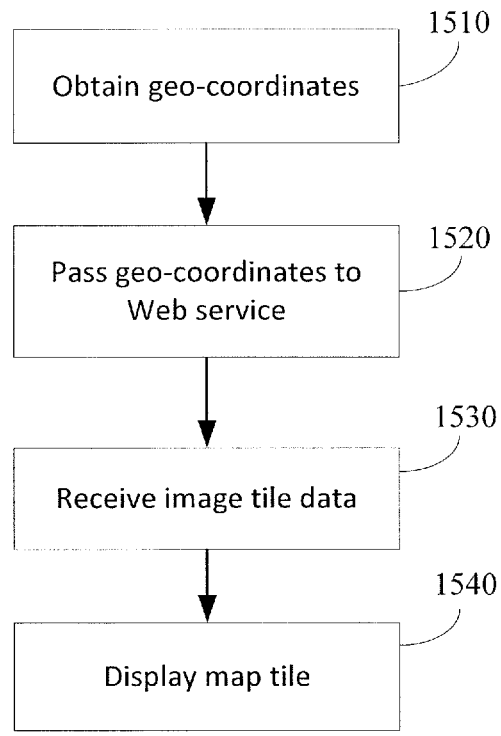
FIG. 15 shows a process flow for providing a local map tile as a visual identification of a place according to an embodiment of the invention.

FIG. 15 shows a process flow for providing a local map tile as a visual identification of a place according to an embodiment of the invention. Referring to FIG. 15, geo-coordinates for a location can be obtained 1510. In one embodiment, a location's latitude and longitude can be used to calculate geo-coordinates for the location. In another embodiment, the location's geo-coordinates can be stored as part of a location resolved place name along with the place id as described with respect to FIG. 6.

In step 1520, the location's geo-coordinates can be passed to a web service such as the BING Imagery service, which returns an image tile of a portion of the map around the geo-coordinates. Once the image tile data is received from the web service (1530), the map can be rendered to display the map tile as the "photo" of the location (1540).

It can also be useful to know where and when an email, contact, calendar, meeting, message, and the like was created or modified. For example, it can be useful to know where the user was when he/she wrote a particular email or exchanged contacts with a client. This may be particularly useful where, as a current trend, people access their email and scheduling accounts across multiple devices and while at various locations. According to an embodiment, the physical location of a user (upon consent of the user) can be stored and used with respect to email and calendar items.

Many filesystems include a WhenCreated/WhenModified property with respect to when files and documents are created and modified. When a file is created or modified, a timestamp is stored associated with the file. The WhenCreated/WhenModified property enables a sorting of the files according to the time property of when the item was created. However, this property only indicates when an item was created, not where it was created.

According to some embodiments, a WhereCreated/WhereModified property is included for emails, calendar items and contact items. Given user consent, these properties can be stamped with geo-coordinates identifying where such items were created and where they were modified.

Figure 16:
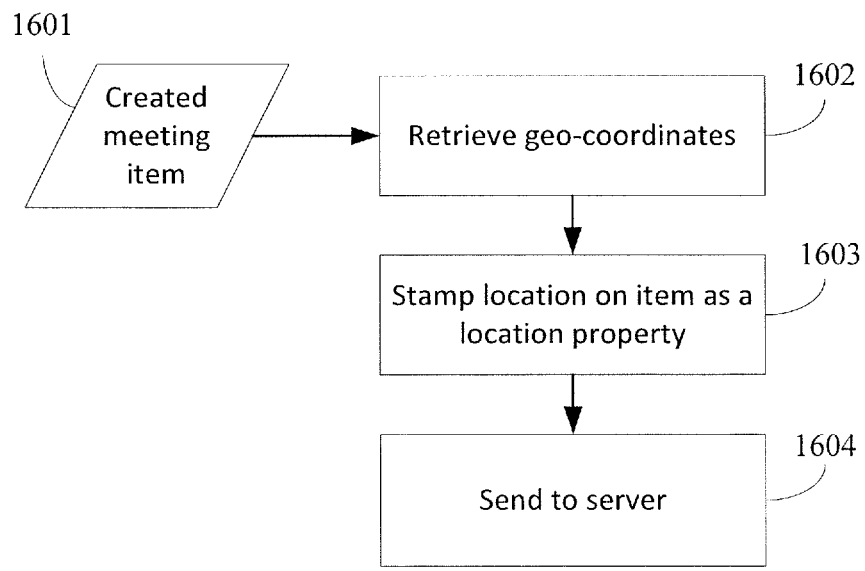
FIG. 16 shows a process flow in which a location property of an embodiment of the invention is assigned to a meeting item.

In one embodiment, when a message item is created, a latitude/longitude can be stamped (associated with) the message item. FIG. 16 shows a process flow in which a location property of an embodiment of the invention is assigned to a meeting item. When a meeting item 1601 is created (or modified), the geo-coordinates are retrieved from a user device (when the user has opted to allow for such location tracking) 1602. The geo-coordinates are then stamped on the item as a location property 1603.

Mobile devices such as cell phones and smart phones and many other GPS enabled devices are able to retrieve geo-coordinates of the location at the time of creation/modification of items and stamp such information on local items. "Stamping" refers to appending information to a file. Here, the stamping appends information identifying where the client device was when a meeting item was created or modified to the meeting item. This process can be similar to associating a timestamp to a file.

The location property can be defined by the WhereCreated and WhereModified properties, and can store the latitude, longitude, and altitude as, for example, double type (double), as well as the source of the coordinates as an integer data type followed by an enumerated data type (int, enum)—integer to enumeration. When the meeting item is stamped with the location property, the location stamp (i.e., the location property stamped on the meeting item) can be passed along to a server 1604. According to an embodiment, when a meeting item is created or modified, the system can retrieve a set of geo-coordinates of where the meeting item request originated and then store the geo-coordinates in a location property of the meeting item.

WhereCreated/WhereModified can be used to search, sort, and/or filter items. Once items are stamped with geo-coordinates it is possible to search and filter items based on the WhereCreated/WhereModified properties, allowing for many scenarios including, but not limited to, listing emails sent from home; finding contacts created during a trip to New York, finding contacts created while visiting a specific customer site; as well as mining, plotting, and analyzing geographical data about usage behavior.

For example, by using the Location property of an embodiment of the invention, it can be possible to list emails that a person sent while working from a downtown office. The person may have remembered that a particular message was sent while working at that location and now has another tool to search for the particular message. The location property can also be used by an email client to control access and/or publishing rights. For example, WhereCreated/WhereModified can be used to define rules that may be able to prevent or inhibit the reading of certain emails outside of the workplace, which may be helpful when handling confidential materials.

Figure 17:
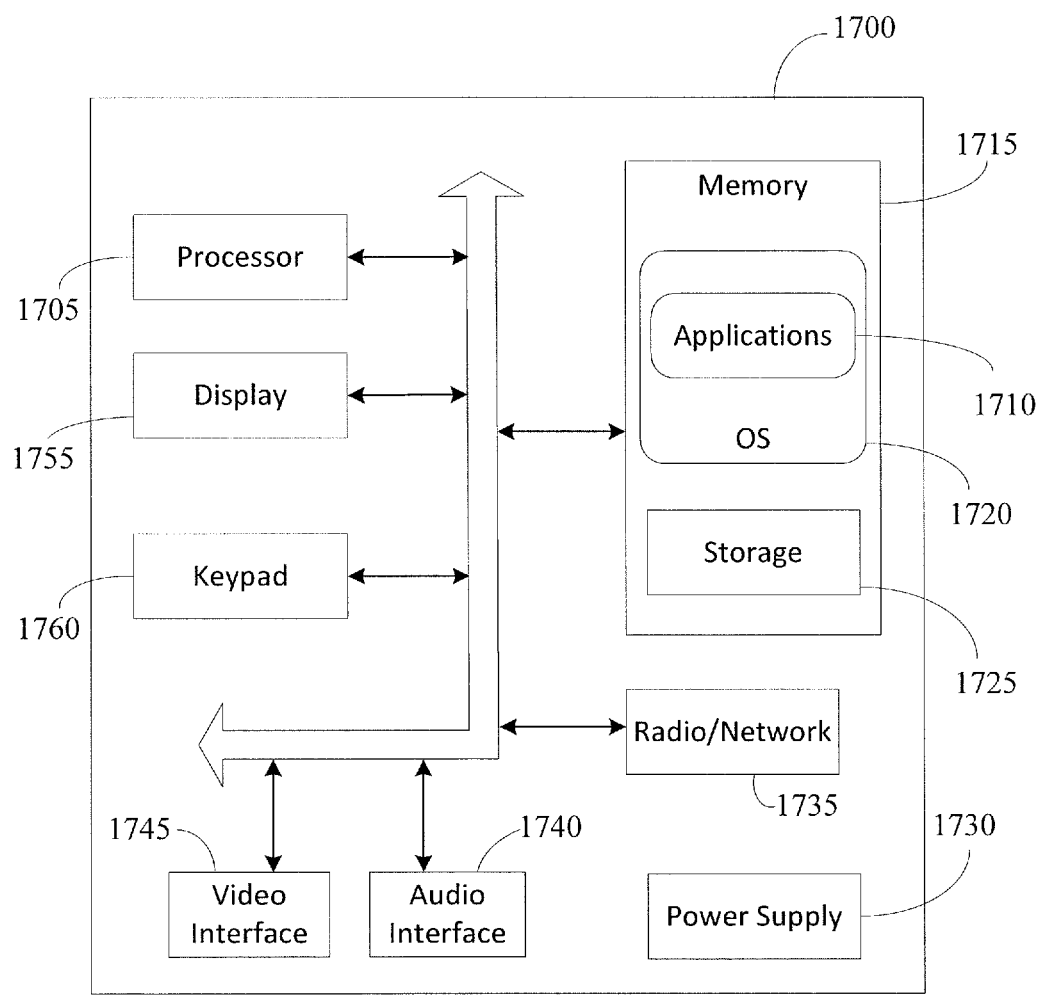
FIG. 17 shows a block diagram illustrating components of a computing device used in some embodiments.

FIG. 17 shows a block diagram illustrating components of a computing device used in some embodiments. For example, system 1700 can be used in implementing a server or a client device in the form of a desktop or notebook computer or a tablet or a smart phone that can run one or more applications. In some embodiments, system 1700 is an integrated computing device, such as an integrated PDA and wireless phone.

System 1700 includes a processor 1705 that processes data according to instructions of one or more application programs 1710, and/or operating system 1720. The one or more application programs 1710 may be loaded into memory 1715 and run on or in association with the operating system 1720. Examples of application programs include phone dialer programs, web conferencing programs, e-mail programs, PIM programs, word processing programs, spreadsheet programs, Internet browser programs, messaging programs, game programs, and the like. Other applications may be loaded into memory 1715 and run on the device, including various client and server applications.

System 1700 also includes non-volatile storage 1725 within memory 1715. Non-volatile storage 1725 may be used to store persistent information that should not be lost if system 1700 is powered down. Application programs 1710 may use and store information in non-volatile storage 1725, such as e-mail or other messages used by an e-mail application, and the like. A synchronization application may also be included and reside as part of the application programs 1710 for interacting with a corresponding synchronization application on a host computer system (such as a server) to keep the information stored in non-volatile storage 1725 synchronized with corresponding information stored at the host computer system.

System 1700 has a power supply 1730, which may be implemented as one or more batteries and/or an energy harvester (ambient-radiation, photovoltaic, piezoelectric, thermoelectric, electrostatic, and the like). Power supply 1730 might further include an external power source, such as an AC adapter or a powered docking cradle that supplements or recharges the batteries.

System 1700 may also include a radio/network interface 1735 that performs the function of transmitting and receiving radio frequency communications. The radio/network interface 1735 facilitates wireless connectivity between system 1700 and the "outside world," via a communications carrier or service provider. Transmissions to and from the radio/network interface 1735 are conducted under control of the operating system 1720, which disseminates communications received by the radio/network interface 1735 to application programs 1710 and vice versa.

The radio/network interface 1735 allows system 1700 to communicate with other computing devices, such as over a network.

An audio interface 1740 can be used to provide audible signals to and receive audible signals from the user. For example, the audio interface 1740 can be coupled to a speaker to provide audible output and to a microphone to receive audible input, such as to facilitate a telephone conversation. System 1700 may further include video interface 1745 that enables an operation of an optional camera (not shown) to record still images, video stream, and the like. Visual output can be provided via a touch screen display 1755. In some cases, the display may not be touch screen and user input elements, such as buttons, keys, roller wheel, and the like are used to select items displayed as part of a graphical user interface on the display 1755. A keypad 1760 can also be included for user input. The keypad 1760 may be a physical keypad or a soft keypad generated on the touch screen display 1755.

It should be understood the any mobile or desktop computing device implementing system 1700 may have more or fewer features or functionality than described and is not limited to the configurations described herein.

In various implementations, data/information stored via the system 1700 may include data caches stored locally on the device or the data may be stored on any number of storage media that may be accessed by the device via the radio/network interface 1735 or via a wired connection between the device and a separate computing device associated with the device, for example, a server computer in a distributed computing network, such as the Internet. As should be appreciated such data/information may be accessed through the device via the radio interface 1735 or a distributed computing network. Similarly, such data/information may be readily transferred between computing devices for storage and use according to well-known data/information transfer and storage means, including electronic mail and collaborative data/information sharing systems.

Certain techniques set forth herein may be described in the general context of computer-executable instructions, such as program modules, executed by one or more computing devices. Generally, program modules include routines, programs, objects, components, and data structures that perform particular tasks or implement particular abstract data types.

Embodiments may be implemented as a computer process, a computing system, or as an article of manufacture, such as a computer program product or computer-readable medium. Certain methods and processes described herein can be embodied as code and/or data, which may be stored on one or more computer-readable media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process.

In accordance with embodiments of the invention, computer-readable media can be any available computer-readable storage media or communication media that can be accessed by the computer system.

Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

By way of example, and not limitation, computer-readable storage media may include volatile and non-volatile, removable and non-removable media implemented in any method or technology for storage of information such as computer-readable instructions, data structures, program modules or other data. For example, a computer-readable storage medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); or other media now known or later developed that is capable of storing computer-readable information/data for use by a computer system. "Computer-readable storage media" should not be construed or interpreted to include any carrier waves or propagating signals.

In addition, the methods and processes described herein can be implemented in hardware modules. For example, the hardware modules can include, but are not limited to, application-specific integrated circuit (ASIC) chips, field programmable gate arrays (FPGAs), and other programmable logic devices now known or later developed. When the hardware modules are activated, the hardware modules perform the methods and processes included within the hardware modules.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

It should be understood that the examples and embodiments described herein are for illustrative purposes only and that various modifications or changes in light thereof will be suggested to persons skilled in the art and are to be included within the spirit and purview of this application.

What is claimed is:

1. A computer-implemented method comprising:
    displaying a location field of a meeting item to a user, wherein the location field is represented in a graphical user interface and configured to display a place name, the place name comprising a character string; receiving an interaction, in the location field on the graphical user interface, with the place name displayed in the location field of the meeting item, wherein the interaction with the place name comprises: touching of the displayed place name or clicking or moving of a mouse over the displayed place name; and in response to receiving the place name from the interaction with the place name, retrieving information about a location associated with the place name from a web service; and
    displaying mapping information about the location, wherein the meeting item comprises a meeting item form and the location field comprises a location input field, wherein the place name is one of at least one location suggestion for input to the meeting item form.

2. The method of claim 1, wherein retrieving the information about the location from the web service comprises:
    using a uniform resource identifier associated with the place name to request the information from the web service.

3. The method of claim 1, wherein the at least one location suggestion comprises a suggestion based on recipient information associated with a named recipient of the meeting invitation, wherein the recipient information associated with the named recipient comprises contact information of the recipient.

4. The method of claim 1, wherein the at least one location suggestion comprises a suggestion based on a list of recently used locations, wherein in response to receiving a selection of the place name in the location input field: determining whether the place name is on the list of recently used locations or is not on the list of recently used locations; and if the place name is on the list of recently used locations, updating a relevance index associated with the place name; if the place name is not on the list of recently used locations, adding the place name to the list of recently used locations.

5. The method of claim 1, wherein displaying information about the location comprises displaying a map image tile for the location.

6. The method of claim 5, wherein displaying the map image tile for the location comprises:
    obtaining geo-coordinates of the location;
    passing the geo-coordinates to a web service;
    receiving image tile data from the web service; and
    rendering the image tile data to display the map image tile, the map image tile comprising a map centered around geo-coordinates of the location.

7. The method of claim 1, wherein in response to a user entering the place name within the location field, pairing the place name with its geo-coordinates.

8. The method of claim 7, wherein the place name is a room inside a building and the geo-coordinates are specific to the room and separate from geo-coordinates of the building.

9. The method of claim 7, wherein pairing the place name with its geo-coordinates comprises:
    performing a look-up operation of the place name against at least one source; and
    returning geo-coordinates for the place name;
    wherein the at least one source comprises a server storing directory information of rooms within a building; a server providing location and mapping services; a server storing contact information; a server storing favorite locations; and/or a server providing a phonebook service.

10. The method of claim 1, further comprising:
upon creation of the meeting item, retrieving geo-coordinates of a user device on which the meeting item was created; and
stamping a location property comprising the geo-coordinates on the meeting item.

11. A computer readable storage medium having instructions stored thereon that direct a computing system to:
display a graphical user interface for a meeting item comprising an enhanced location input field, wherein the enhanced location input field is an input field configured to display a character string as it is input to the meeting item and provide at least one of context, supplemental information, and suggestions for meeting locations;
surface suggestions for a meeting location upon user interaction with the enhanced location input field of the meeting item, wherein the interaction with the enhanced location input comprises: touching of the displayed enhanced location input or clicking or moving of a mouse over the displayed enhanced location input;
retrieve information about a location associated with the enhanced location field from a web service; and
display mapping information about the location.

12. The medium of claim 11, further comprising instructions that direct the computing system to:
surface a location contact card that displays the mapping information about the location and a map image tile of the location in response to the user interaction with the enhanced location input field.

13. The medium of claim 11, wherein the suggestions are displayed in the graphical user interface in a dropdown menu from the enhanced location input field.

14. A system comprising:
a processor;
a database; and
a computer-readable storage medium having instructions stored thereon that when executed by the processor perform functions comprising:
creating a new meeting item, the meeting item comprising a location input field, wherein the location input field is an enhanced input field in a graphical user interface configured to display a character string as it is input to the meeting item and provide at least one of context, supplemental information, and suggestions for meeting locations;
providing location suggestions within the location input field of the meeting item based on one or more sources; for a location input to the location input field, resolving a place name or address of the location with geo-coordinates of the location; and
retrieving and displaying information about a resolved location displayed in a location field of a received meeting item from a web service in response to a user interacting with the location field of the received meeting item, wherein the interaction with location field of the meeting item comprises: touching of the displayed location field of the meeting item or clicking or moving of a mouse over the displayed location field of the meeting item.

15. The system of claim 14, wherein the computer-readable storage medium has instructions stored thereon that when executed by the processor perform functions further comprising:
storing an identifier associated with the location in the database, the identifier used to retrieve the information about the location from the web service; and
storing the geo-coordinates of the location in the database, the geo-coordinates being updated during the retrieving of the information about the location.

16. The system of claim 14, wherein the one or more sources comprises:
an external web service for providing suggestions based on street address and/or place names; or
a directory service for providing suggestions based on specific room locations within a building; or
a mailbox storing a contact list for providing suggestions based on contact information associated with attendees and an organizer of the meeting item; or
a history cache or database storing recently used locations;
a combination of the external web service, the directory service, the mailbox, and the history cache or database.

17. The system of claim 14, wherein retrieving and displaying information about the resolved location displayed in the location field of the received meeting item from the web service in response to a user interacting with the location field of the received meeting item comprises:
retrieving an image tile of a map portion around the geo-coordinates from a map or imagery web service; and
displaying the image tile.

* * * * *